(12) United States Patent
Lukas et al.

(10) Patent No.: US 10,955,549 B2
(45) Date of Patent: Mar. 23, 2021

(54) MELTING LAYER ESTIMATION BY WEATHER RADAR DEVICE

(71) Applicant: Honeywell International Inc., Morris Plains, NJ (US)

(72) Inventors: Jan Lukas, Brno (CZ); David C. Vacanti, Renton, WA (US)

(73) Assignee: Honeywell International Inc., Charlotte, NC (US)

( * ) Notice: Subject to any disclaimer, the term of this patent is extended or adjusted under 35 U.S.C. 154(b) by 411 days.

(21) Appl. No.: 15/782,573

(22) Filed: Oct. 12, 2017

(65) Prior Publication Data

US 2019/0113618 A1  Apr. 18, 2019

(51) Int. Cl.

| | | |
|---|---|---|
| *G01S 13/95* | (2006.01) | |
| *G01S 13/42* | (2006.01) | |
| *G01S 7/41* | (2006.01) | |
| *H01Q 21/00* | (2006.01) | |
| *G01S 13/34* | (2006.01) | |
| *G01S 13/44* | (2006.01) | |
| *H01Q 1/28* | (2006.01) | |
| *G01S 13/02* | (2006.01) | |
| *H01Q 1/52* | (2006.01) | |

(52) U.S. Cl.
CPC .............. *G01S 13/958* (2013.01); *G01S 7/411* (2013.01); *G01S 13/34* (2013.01); *G01S 13/424* (2013.01); *G01S 13/4463* (2013.01); *G01S 13/953* (2013.01); *H01Q 1/28* (2013.01); *H01Q 21/00* (2013.01); *G01S 2013/0245* (2013.01); *G01S 2013/0254* (2013.01); *H01Q 1/525* (2013.01)

(58) Field of Classification Search
CPC .... G01S 13/958; G01S 13/953; G01S 13/424; G01S 7/411; G01S 13/34; G01S 13/4463; H01Q 21/00
USPC ......................................... 342/26 R, 123, 135
See application file for complete search history.

(56) References Cited

U.S. PATENT DOCUMENTS

| | | | |
|---|---|---|---|
| 4,538,150 A | * | 8/1985 | Bone, Jr. ................ G01S 7/4021 342/123 |
| 4,940,987 A | | 7/1990 | Frederick |
| 5,028,929 A | | 7/1991 | Sand et al. |
| 5,202,690 A | | 4/1993 | Frederick |
| 5,781,146 A | | 7/1998 | Frederick |
| 5,828,332 A | | 10/1998 | Frederick |
| 5,850,619 A | | 12/1998 | Rasmussen et al. |
| 5,920,276 A | | 7/1999 | Frederick |
| 6,347,767 B1 | | 2/2002 | Holmen |
| 6,377,202 B1 | | 4/2002 | Kropfli et al. |

(Continued)

OTHER PUBLICATIONS

Sanchez-Diezma et al., "Identification of the bright band through the analysis of volumetric radar data," Journal of Geographic Research, vol. 105, No. D2, Jan. 27, 2000, pp. 2225-2236.

(Continued)

*Primary Examiner* — Bo Fan
(74) *Attorney, Agent, or Firm* — Shumaker & Sieffert, P.A.

(57) ABSTRACT

In some examples, a system is configured for determining an estimated altitude of a melting layer, and the system includes a weather radar device configured to transmit radar signals and receive reflected radar signals. In some examples, the system also includes processing circuitry configured to determine the estimated altitude of the melting layer based on the reflected radar signals.

20 Claims, 10 Drawing Sheets

(56) References Cited

U.S. PATENT DOCUMENTS

| | | |
|---|---|---|
| 6,597,305 B2 | 7/2003 | Szeto et al. |
| 6,615,140 B2 | 9/2003 | White et al. |
| 6,667,710 B2 | 12/2003 | Cornell et al. |
| 6,690,317 B2 | 2/2004 | Szeto et al. |
| 6,707,415 B1 | 3/2004 | Christianson |
| 6,720,906 B2 | 4/2004 | Szeto et al. |
| 6,741,203 B1 | 5/2004 | Woodell |
| 6,839,018 B2 | 1/2005 | Szeto et al. |
| 7,417,577 B2 | 8/2008 | Testud et al. |
| 7,492,304 B1 | 2/2009 | Woodell et al. |
| 7,541,971 B1 | 6/2009 | Woodell et al. |
| 8,068,050 B2 | 11/2011 | Christianson |
| 8,111,186 B2 | 2/2012 | Bunch et al. |
| 8,228,227 B2 | 7/2012 | Bunch et al. |
| 8,289,202 B1 | 10/2012 | Christianson |
| 8,659,468 B2 | 2/2014 | Pujol et al. |
| 8,724,099 B2 | 5/2014 | Asahara et al. |
| 9,188,700 B2 | 11/2015 | Bunch et al. |
| 9,244,166 B1 | 1/2016 | Finley et al. |
| 9,720,082 B1 | 8/2017 | Dana et al. |
| 2009/0243917 A1 | 10/2009 | Bon et al. |
| 2010/0245167 A1 | 9/2010 | Bunch et al. |
| 2011/0148694 A1 | 6/2011 | Bunch et al. |
| 2011/0187588 A1 | 8/2011 | Khatwa et al. |
| 2012/0133551 A1 | 5/2012 | Pujol et al. |
| 2012/0139778 A1 | 6/2012 | Bunch et al. |
| 2013/0008174 A1 | 1/2013 | Gould et al. |
| 2013/0234884 A1 | 9/2013 | Bunch et al. |
| 2015/0073710 A1 | 3/2015 | Deierling et al. |
| 2015/0304813 A1 | 10/2015 | Esposito et al. |
| 2016/0011334 A1 | 1/2016 | Khatwa et al. |
| 2016/0011839 A1 | 1/2016 | Khatwa et al. |
| 2016/0033641 A1 | 2/2016 | Bunch et al. |
| 2016/0131758 A1* | 5/2016 | Christianson ........... G01S 7/062 342/26 R |
| 2016/0274271 A1* | 9/2016 | Lukas ...................... G01S 7/04 |
| 2017/0104276 A1 | 4/2017 | Vacanti et al. |
| 2017/0160389 A1 | 6/2017 | Vacanti |

OTHER PUBLICATIONS

Extended Search Report from counterpart European Application No. 18199745.3, dated Feb. 20, 2019, 8 pp.

Response to Extended Search Report dated Feb. 20, 2019, from counterpart European Application No. 18199745.3, filed Oct. 4, 2019, 26 pp.

"NASA Goes Down Under to Tap High-Altitude Ice," NASA News, retrieved Jul. 8, 2014 from http://www.nasa.gov/aero/haic_camaign.html.U7wsHPIdUjQ, 3 pp.

Boudala, et al., "Ice water content and precipitation rate as a function of equivalent radar reflectivity and temperature based on in situ observations," Dec. 2006, Journal of Geophysical Research, vol. 111, 13 pp.

Heymsfield, et al., "Improved Radar Ice Water Content Retrieval Algorithms Using Coincident Microphysical and Radar Measurements," Sep. 2005, American Meterological Society, vol. 44, pp. 1391-1412.

Heymsfield, et al., "Testing IWC Retrieval Methods Using Radar and Ancillary Measurements with In Situ Data," Jan. 2008, American Metorological Society, vol. 47, pp. 135-163.

Mason, et al., "The Ice Particle Threat to Engines in Flight," Jan. 2006, 44th AIAA Aerospace Sciences Meeting and Exhibit, AIAA 2006-206, 21 pp.

Noel, V. et al., "Classification of ice crystal shapes in midlatitude ice clouds from three years of lidar observations over the SIRTA observatory," Journal of Atmospheric Sciences 63, hal-00115274, version 1-20, Nov. 2006, pp. 2978-2991.

Sayres, et al., "Validation and Determination of ice water content-radar reflectivity relationships during CRYSTAL-FACE: Flight requirements for future comparisons," Journal of Geophysical Research, vol. 113, Mar. 6, 2008, 10 pp.

U.S. Appl. No. 15/457,844, by David C. Vacanti, filed Mar. 13, 2017.

* cited by examiner

MELTING LAYER ESTIMATION BY WEATHER RADAR DEVICE

TECHNICAL FIELD

This disclosure relates to weather radar.

BACKGROUND

A radar device may be configured to detect the reflectivity of particles in the air, which may include water molecules. In general, liquid water droplets in the air may have higher reflectivity than water molecules that are frozen as ice crystals in the air. In some examples, partially melted snow, partially melted ice crystals, or partially frozen liquid water droplets may have higher reflectivity than completely melted liquid water droplets or completed frozen ice crystals.

If the temperature of the air near the surface of the earth is greater than the freezing temperature of water, water molecules in the air may be liquid up to an altitude known as the melting layer. At altitudes that are higher than the melting layer, water molecules in the air may be frozen as snow or ice. In some examples, there may be a range of altitudes below the melting layer at which water molecules in the air may be partially melted and/or partially frozen. This range of altitudes may be known as the bright band because of the higher reflectivity of the water molecules in the bright band.

Separate from the bright band, the melting layer may also be an important consideration for vehicles. Ice crystals may be present in the air at altitudes above the melting layer, and these ice crystals may interfere with the operation of vehicles. For example, the ice crystals at altitudes above the melting layer may disrupt the operation of aircraft engines. The ice crystals may also disrupt the operation of sensors mounted on aircraft flying above the melting layer. The liquid water present in a storm cloud may travel upwards to the melting layer, where the liquid water may freeze to form ice crystals. Therefore, higher quantities of ice crystals may exist just above the melting layer in storm clouds, as compared to other locations above the melting layer.

SUMMARY

This disclosure is directed to systems, devices, and methods for determining an estimate of an altitude of a melting layer. A system may include a weather radar device configured to transmit radar signals into a volume of space that includes a melting layer. The weather radar device may also be configured to estimate the reflectivity of a volume of space based on the radar signals that are reflected back from the volume of space. The reflectivity of the volume of space may be based on the water molecules in the air, including the concentration and the state of the water molecules. The weather radar device may be further configured to perform additional weather radar functions, including predicting hail, lightning, areas of attenuated radar signals, and/or tracking storm movements and growth and rendering weather information on a display. In some examples, the system may also include processing circuitry configured to determine an estimated altitude of the melting layer based on the reflectivity of the volume of space based on the reflected radar signals from two or more locations in space. The weather radar device may be a mechanically scanned radar device and/or a phased array radar device.

In one example, a system is configured for determining an estimated altitude of a melting layer, and the system includes a weather radar device configured to transmit radar signals and receive reflected radar signals. In some examples, the system also includes processing circuitry configured to determine the estimated altitude of the melting layer based on a difference in reflectivity based on the reflected radar signals.

In another example, a method is for determining an estimated altitude of a melting layer, and the method includes transmitting radar signals by a weather radar device. The method also includes receiving reflected radar signals at the weather radar device and determining the estimated altitude of the melting layer based on a difference in reflectivity based on the reflected radar signals.

Another example is directed to a device including a computer-readable medium having executable instructions stored thereon, configured to be executable by one or more processors for causing the one or more processors to cause a weather radar device to transmit radar signals and receive reflected radar signals. The executable instructions further cause the one or more processors to determine the estimated altitude of the melting layer based on a difference in reflectivity based on the reflected radar signals.

The details of one or more examples are set forth in the accompanying drawings and the description below. Other features, objects, and advantages will be apparent from the description and drawings, and from the claims.

DETAILED DESCRIPTION

Figure 1:
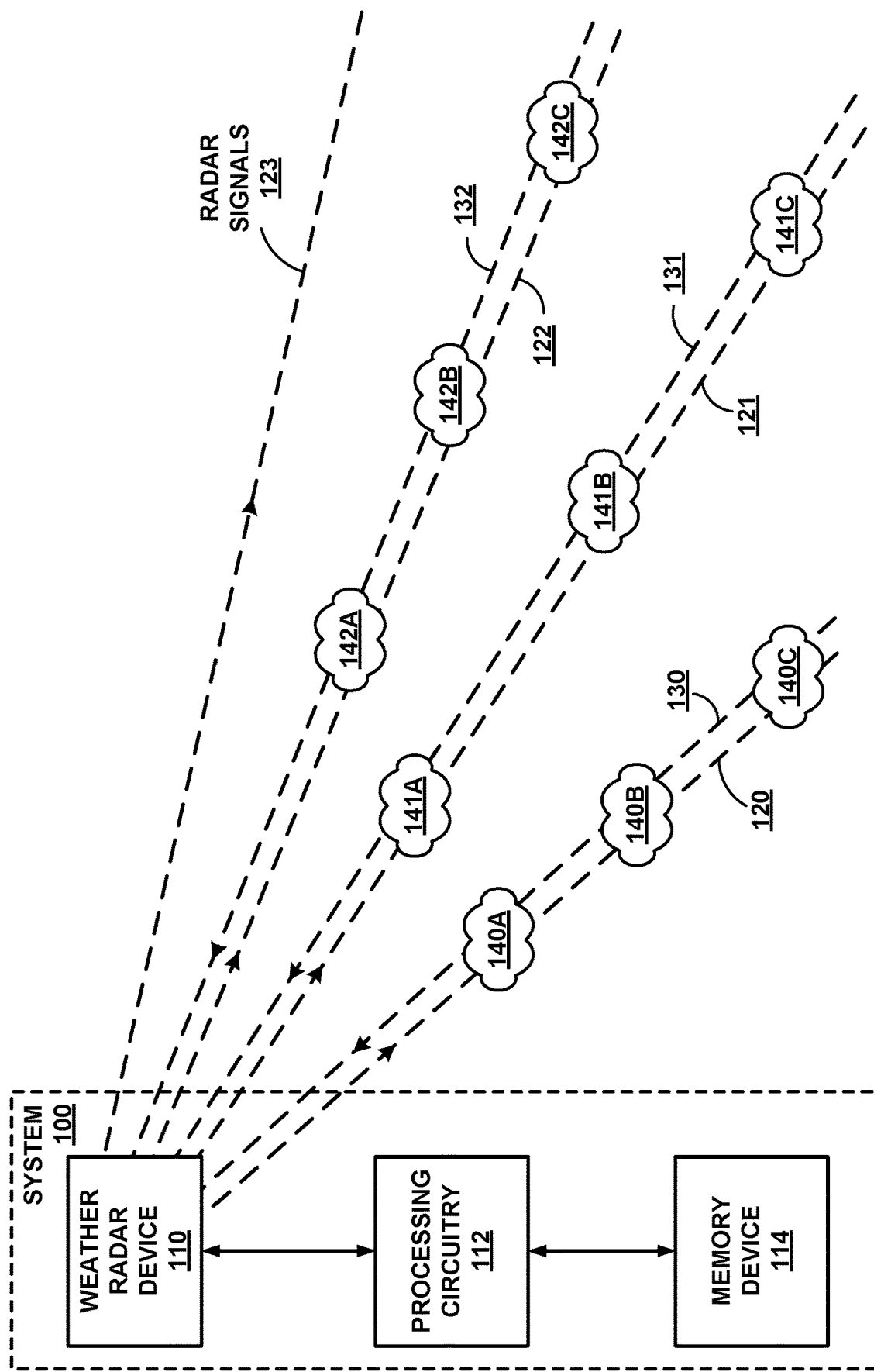
FIG. 1 is a conceptual block diagram of a system for determining an estimated altitude of a melting layer, in accordance with some examples of this disclosure.

Various examples are described below generally directed to devices, systems, and methods for determining an estimated altitude of a melting layer. The melting layer generally refers to an altitude or altitude band in the atmosphere in which water is partially frozen or partially melted. Water at altitudes above the melting layer is typically in a solid form (i.e., ice crystals), and water at altitudes below the melting layer is typically in a liquid form (i.e., rain). The melting layer may exist above the surface of the Earth in the atmosphere. Near the Equator, the altitude of the melting layer may exist at approximately twenty thousand feet above the surface. Near the poles, there may be no melting layer because the temperature at the surface of the Earth may be less than zero degrees Celsius.

Within deep convective storm cells there may exist a melting layer that separates altitudes where water is present as ice and liquid. In higher (colder) altitudes above the melting layer (also called freezing altitudes), water is present as ice, while below the melting layer, water is present as liquid or mixed phase. The knowledge of the melting layer altitude may be critical for some functions of weather radar, such as for predicting hail and high altitude ice crystals.

Weather radar may estimate the melting layer altitude from aircraft altitude and static air temperature at that altitude using an atmospheric model (for example, but not limited to, a standard atmospheric model with temperature decreasing by 0.00198 degrees Celsius per foot of altitude). However, in events such as high-altitude ice crystals presence, the atmosphere does not always follow this model well. Therefore, having means to observe the melting layer directly potentially allows weather radar to more accurately predict high altitude ice crystals concentrations, hail, and possibly even other phenomena. This disclosure describes techniques for estimating a melting layer altitude that may, in some scenarios, be more accurate than existing techniques for estimating the melting layer altitude.

Since water in liquid form has a significantly higher radar reflectivity factor than ice crystals (e.g., up to more than five times higher), an estimated melting layer altitude may be determined by weather radar as a location of a vertical reflectivity rate of change, where there exists a steep change from low to high reflectivity values in the down direction. While existing mechanically scanned weather radars may have a limited ability to focus into an area of interest and detect the melting layer because the radar may be slower than phased-array radar devices and is typically fully occupied by weather scanning, a mechanically scanned weather radar could still be possibly used for melting layer detection. The detection by a mechanically scanned weather radar would be less optimal (e.g. bigger uncertainty or significantly reduced refresh rate) due to the mentioned limitations. Therefore, in addition to simple detection by a mechanically scanned system, this disclosure also describes techniques for using phased-array radar devices that may be capable of using multiple simultaneous beams, and other features to determine a more accurate estimate of the melting layer altitude directly, at least at closer ranges.

The determination of an estimated altitude of the melting layer may be implemented as a signal post-processing block on a radar processor for an electronically scanned weather radar. The radar device may be configured to scan for particles and to focus the scanning to the suspected location of the melting layer. The processing circuitry can a priori estimate the suspected altitude of the melting layer using some atmospheric model, or the processing circuitry may be configured to determine whether the melting layer is below or above the radar device based on the measured static air temperature. Typically, if aircraft use this function at a cruising altitude, then the melting layer will be below the aircraft.

In particular, a phased-array radar device such as the Digital Active Phased Array (DAPA) Radar™ by Honeywell International Inc. of Morris Plains, N.J., may use multiple simultaneous, vertically stacked beams to scan the area and locate the abrupt change in reflectivity factor. In some examples, the radar beams may be stacked vertically and then the radar device may be configured to scan horizontally to determine the spatial consistency of the estimated melting-layer altitude. In other examples, multiple simultaneous beams might be pointed to arbitrary directions, not necessarily vertically stacked. An electronically scanned radar such as DAPA with multiple simultaneous beams on receive may allow determination of an estimated altitude of the melting layer by measuring the entire extent of the atmosphere or a portion of the entire extent in milliseconds in order to map the location of the melting layer. Mechanically scanned radar systems may have a difficulty finding the melting layer because scanning the entire vertical and horizontal extent of the weather may take 30 seconds or more. Aircraft motion and beam stabilization over that long period of time may cause decorrelation of the measured radar data among all of the many mechanically scanned beam positions. However, the ability of a phased-array radar device to measure the entire extent or a portion of the entire extent of the atmosphere in multiple simultaneous beam positions and one or more sets of transmit pulses may eliminate this motion and decorrelation and may allow for more certain determination of an estimated altitude.

In some examples, a phased-array radar device may be configured to transmit radar signals in a single transmit beam and receive reflected signals. Processing circuitry may be configured to analyze the reflected signals to form multiple receive beams, where each receive beam has a different elevation angle. The processing circuitry may then be configured to determine an estimated altitude of the melting layer within each receive beam. In some examples, the processing circuitry is configured to determine an average estimated altitude of the melting layer based on the estimated altitudes from the receive beams. The average estimated altitude may be more accurate than a single estimated altitude. The processing circuitry may also be configured to remove outlying estimates of the melting layer altitude, such as estimated altitudes that are more than one or two standard deviations from the average estimated altitude.

Determination of an estimated altitude of the melting layer may be important in order to determine the volume of space that is most likely to contain high-altitude ice crystals (HAIC), which is a phenomenon also known as high-ice-water content (HIWC). A phased-array radar device, as described herein, may include unique capabilities to determine an estimated altitude of the melting layer and ultimately the volumes of space that are most likely to include HAIC/HIWC. An existing system may use a single beam to determine an estimated altitude of the melting layer by first determining an estimated altitude of the bright-band altitude. A phased-array radar device configured to use multiple beams may be able to search the entire volumetric buffer in three seconds or less, as compared to thirty seconds for a full scan for an existing mechanically scanned radar system with a single beam.

The phased-array radar device may be configured to use multiple simultaneous beams to detect the bright band and/or the melting layer as an incidental part of a normal three-second volumetric scan. The phased-array radar device may be configured to accurately locate the melting layer as a part of normal operation because of the multiple beams. The phased-array radar device may also be configured to use beams that cross the melting layer at large, steep angles because steep beams may provide the most accurate estimate of the altitude of the melting layer.

Using the multiple beams, the phased-array radar device may find the melting layer above or below the present altitude of the ownship vehicle. Depending on the phase of flight or the season of the year (locally), the melting layer may or may not be below the ownship vehicle. Thus, the phased-array radar device may be further configured to create multiple simultaneous beams that can see above and below flight level take care of this issue automatically. An existing system may be configured to conduct a dedicated search for the melting layer with one or more beams above and below the ownship vehicle. The melting layer may not be below the aircraft at all times.

A radar device can determine an estimated altitude of the melting layer with one beam. However, the availability of multiple simultaneous beams to a phased-array radar device may increase the accuracy of the estimated altitude. Furthermore, the phased-array radar device may not need to conduct a dedicated search for altitude of the melting layer. Using the multiple beams, the phased-array radar device may be configured to simultaneously detect of all of the weather conditions in the surveilled volume while gathering data relating to the melting layer. The phased-array radar device may be quicker and more accurate than existing system because of the simultaneity of weather detection and melting layer detection without the need to specifically raster scan to locate the estimated altitude of the melting layer.

An existing system may conduct a raster scan using a single beam radar in order to specifically locate the melting layer. The existing mechanically scanned system includes a volumetric buffer that collects all elevation and azimuth angles, but it will take thirty seconds to conduct the full scan. Performing the detection of the melting layer during the volumetric buffer scan would introduce additional delay and would be limited only to low-tilt scanning. An alternative would be conducting a full scan with a single beam and then scanning for the melting layer, but this method would place the delay between consecutive buffer scans. Therefore, when it takes thirty seconds to update the volumetric buffer, it is costly to conduct a dedicated search for the melting layer. For an existing system, the next set of raster scans in azimuth and elevation starts immediately in order to offset vehicle motion. The vehicle will have traveled a considerable distance (e.g., four nautical miles for a commercial aircraft) in the time it takes to conduct the thirty-second volumetric scan. Therefore, the multiple simultaneous beams of the phased-array radar device of this disclosure allow the data to be collected in three seconds and allowing twenty-seven seconds for more detailed studies. This twenty-seven seconds allows the phased-array radar device to look for the melting layer and then look for HAIC and/or perform other functions.

Further, the phased-array radar device can then dwell in areas of potential HAIC and enhance the ability to detect HAIC by coherent integration of successive waveforms. This is not possible with existing mechanically scanned radar system. For a mechanically scanned weather radar with only one beam, the radar will need nearly thirty seconds to collect all of the data needed to fill the volumetric buffer. The multiple simultaneous beams of the phased-array radar device may allow much faster scanning of the entire volume. In some examples, the phased-array radar may cover sixty degrees of simultaneous elevation extent with multiple simultaneous beams to permits scanning the entire volume in three seconds.

During the thirty-second update period of the volumetric buffer of the existing system, the ownship vehicle may travel forward by four nautical miles. The long collection time of the existing system causes the weather to appear to breathe on the screen. That means the magnitude of the storms or the extent of the storms varies from scan to scan in a way that is readily observed by the vehicle operator and crew. In contrast, a very fast three-second update rate using multiple simultaneous beams may stabilize and quickly validate the weather data.

There is an issue of coherence of weather data that is collected over time. A full cumulus cloud may form to forty thousand feet in just fifteen minutes for an altitude growth rate of approximately twenty-seven hundred feet per minute. Thus, one-half of one minute to collect the full volumetric data will lead to considerable change and decorrelation of the collected data. The storm conditions in the thirty-second update rate of a single beam scanned electronically or mechanically will be subject to decorrelation of the data before the entire volume has been collected. Each azimuth pass at a separate elevation angle will contain data that is not coherent with data at the top or bottom of the collection cycle.

In one example, the phased-array radar device of this disclosure may be configured to observe an entire vertical elevation column from ground level to fifty thousand feet simultaneously. The measurement of the storm and characteristics of HAIC conditions will be much more coherent and less likely to decorrelate, as compared to existing systems. The phased-array radar device may have the ability to dwell and come back to regions of interest for critical storm data that will remain vertically coherent and will not decorrelate. This ability to dwell and return may be immensely important to detecting or inferring HAIC, turbulence, hail, and/or other hazards.

The phased-array radar device may have time in the course of the normal volumetric scan update period to conduct a dedicated search for an estimated altitude of the melting layer. The phased-array radar device can provide a coherent detection of the bright band and/or melting layer at every azimuth position when all of the beams (e.g., twelve beams arrayed in elevation) are present. The processing circuitry may be configured to determine if the melting layer is above or below the ownship vehicle. The phased-array radar device can make this determination without thirty seconds passing or needing to provide a dedicated scan to locate the melting layer altitude.

FIG. 1 is a conceptual block diagram of a system 100 for determining an estimated altitude of a melting layer, in accordance with some examples of this disclosure. System 100 may include weather radar device 110, processing circuitry 112, and memory device 114. System 100 may also include other components not depicted in FIG. 1, such as a user interface configured to receive user inputs and present weather information and/or information relating to particles 1140A-140C, 141A-141C, and 142A-142C. System 100 may include memory device 114 configured to store data relating to weather such as temperatures measurements and lapse rates (i.e., temperature change divided by altitude change). Memory device 114 of system 100 may be configured to store data relating to the power and/or waveforms of at least some of radar signals 120-122 and 130-132 at locations in space (e.g., volumes in space). In some examples, radar signals 120-123 may be independent signals differing in any parameters, such as, but not limited to, power and waveform. In other examples, a single transmitted signal may be used instead at least some of or all of the signals 120-123. In some examples, weather radar device 110 may be configured to transmit a radar signal to more locations than radar receives signals from. This is illustrated by signal 123 in FIG. 1, which weather radar device 110 may transmit to a volume of space from which weather radar device 110 does not receive signals.

In some examples, weather radar device 110 may be configured to transmit each of radar signals 120-123 as a single transmit beams. In some examples, weather radar device 110 may be configured to transmit some or all of radar signals 120-123 as part of some transmitted wide single beam. In some examples, weather radar device 110 may be configured to receive each of reflected radar signals 130-132 as separate receive beams. In some examples, smaller or larger number of beams may be used. FIG. 1 depicts three receive beams as an example. Therefore, reflected or returned radar signals 130 may include radar returns from a single beam that reflect off any of particles 140A-140C. Returned radar signals 131 may include radar returns from a single beam that reflect off any of particles 141A-141C. Returned radar signals 132 may include radar returns from a single beam that reflect off any of particles 142A-142C. Weather radar device 110 and processing circuitry 112 may be further configured to perform additional weather radar functions, such as performing volumetric reflectivity scans, predicting hail, predicting lightning, predicting areas of attenuated radar signal, tracking storm movements, tracking storm growth, and/or rendering weather information on a display.

In some examples, system 100 may be mounted on a vehicle such as any mobile object or remote object. In some examples, the vehicle may be an aircraft such as an airplane a helicopter or a weather balloon, or a space vehicle such as a satellite or spaceship. In yet other examples, the vehicle may include a land vehicle such as an automobile or a water vehicle such as a ship or a submarine. The vehicle may also be a manned vehicle or an unmanned vehicle, such as a drone, a remote-control vehicle, or any suitable vehicle without any pilot or crew on board. In some examples, system 100 may be mounted in the nose, the front, the rear, the bottom, and/or the top of the vehicle.

System 100 may include weather radar device 110 and processing circuitry 112. System 100 may also include other components not depicted in FIG. 1, such as a user interface configured to receive user inputs and present weather information and/or information relating to at least some of the locations with particles 140A-140C, 141A-141C, and 142A-142C. System 100 may include memory device 114 configured to store data relating to weather. In some examples, memory device 114 of system 100 may be configured to store waveforms of radar signals and threshold levels for received power of radar signals 130-132. Memory device 114 may be configured to store threshold levels for reflectivity estimated from at least some of the received radar signals 130-132. In some examples, memory device 114 may also be configured to store threshold levels for rates of changes in reflectivity estimated from at least some of radar signals 130-132. The threshold level for reflectivity magnitudes, differences in reflectivity, and rates of change in reflectivity may be expressed in units of Z or dBZ.

For example, processing circuitry 112 may be configured to determine an altitude of a bright band based on the reflectivity at that altitude exceeding a threshold level for a magnitude of reflectivity. An accurate estimate of the brightband altitude range may be useful to vehicles and meteorologists because, for example, the melting layer is typically above the bright band. Therefore, processing circuitry 112 may be configured to determine an estimated altitude of the melting layer based at least in part on an estimated altitude range of the bright band. In some examples, location of the bright band is not needed for melting layer altitude estimation. An accurate determination of the melting-layer altitude may be desirable because ice crystals may form in higher quantities just above the melting layer. Ice crystals may be hazardous for vehicles and engines, such that it may be desirable for vehicles to avoid travelling through areas just above the melting layer near storm clouds.

Weather radar device 110 may include an array of antennas that are configured to transmit at least some of radar signals 120-123 and receive at least some of reflected radar signals 130-132. In some examples, weather radar device 110 may transmit radar signals 120-123 in a range of directions with or without a mechanically scanning device. In some examples, weather radar device 110 may be a phased-array radar device, and the electronic steering of the phased-array radar device may be faster, and/or more energy efficient, as compared to other radar devices with antennas that are mechanically steered. In some examples, weather radar device 110 may be a phased-array radar device that also includes a mechanical steering element in combination with electronic steering of radar signals.

Processing circuitry 112 may be configured to control weather radar device 110 by causing weather radar device 110 to transmit at least some of radar signals 120-123. Processing circuitry 112 may be configured to control the direction and time of transmission of at least some of radar signals 120-123. Processing circuitry 112 may be further configured to analyze at least some of reflected radar signals 130-132, including the intensity, frequency, time of arrival, and angle of arrival of at least some of reflected radar signals 130-132. Processing circuitry 112 may be configured to determine the reflectivity magnitudes along at least one of the beams formed by processing circuitry 112 from corresponding radar signals 130-132.

For example, processing circuitry 112 may be configured to form three beams on receive, where the first beam includes radar signals 130, the second beam includes radar signals 131, and the third beam includes radar signals 132. Processing circuitry 112 may form the three receive beams such that the beams are vertically stacked, horizontally arrayed, or positioned in arbitrary directions. In some examples, processing circuitry 112 may be configured to form more or fewer than three beams on receive. Processing circuitry 112 may be configured to determine the reflectivity magnitude of particles 140A-140C in the first beam based on radar signals 130, determine the reflectivity magnitude of particles 141A-141C in the second beam based on radar signals 131, and determine the reflectivity magnitude of particles 140A-140C in the third beam based on radar signals 132. Processing circuitry 112 may be further configured to determine rates of change in reflectivity along each of the three beams.

Processing circuitry 112 may be configured to determine an estimated altitude of the melting layer based on radar signals 130-132 for each of the three beams. For example, processing circuitry 112 may determine that the melting layer in the first beam is located at or near the volume of space including particles 140A based on the reflectivity of particles 140A and/or the difference in reflectivity between particles 140A and particles 140B. Processing circuitry 112 may then be configured to determine an estimated altitude for the melting layer in the first beam based on the angle of the first beam and the range from weather radar device 110 to particles 140A. Processing circuitry 112 may also be configured to determine estimated altitudes of the melting layer for the second beam and the third beam (e.g., based on the reflectivity of particles 141A-141C and 142A-142C). Processing circuitry 112 may be configured to determine an average estimated altitude by averaging the three estimated altitudes corresponding to the three beams.

If the estimated altitude corresponding to one of the beams is more than one or two standard deviations from the average estimated altitude (especially for larger sample sizes), processing circuitry 112 may be configured to remove the outlier estimate from the average. Processing circuitry 112 may be configured to calculate the standard deviation based on all of the estimated altitudes. Processing circuitry 112 may then be configured to remove some of the estimated altitudes before re-calculating the average estimated altitude.

Processing circuitry 112 may be configured to determine weather conditions based on at least some of reflected radar signals 130-132. Processing circuitry 112 may be configured to analyze the amplitude, the frequency, the time, and/or the phase shift of at least some of reflected radar signals 130-132. In some examples, processing circuitry 112 may be configured to determine the distances or ranges to at least some of particles 140A-140C, 141A-141C, and 142A-142C based on the time between transmission and receipt.

In some examples, processing circuitry 112 may be configured to determine the direction of travel and velocity of at least some of particles 140A-140C, 141A-141C, and 142A-142C based on the difference in frequency between a transmitted signal and a returned signal according to the Doppler effect. By Doppler processing, processing circuitry 112 may differentiate at least some of particles 140A-140C, 141A-141C, and 142A-142C from mainlobe clutter. In some examples, processing circuitry 112 may be configured to determine the size of at least some of particles 140A-140C, 141A-141C, and 142A-142C based on the amplitude and quantity of corresponding reflected radar signals 130-132. In some examples, processing circuitry 112 may be configured to determine the angle of at least some of particles 140A-140C, 141A-141C, and 142A-142C relative to the antenna array of weather radar device 110 based on the receiving direction of corresponding reflected radar signals 130-132 received by the antenna array.

Figure 2:
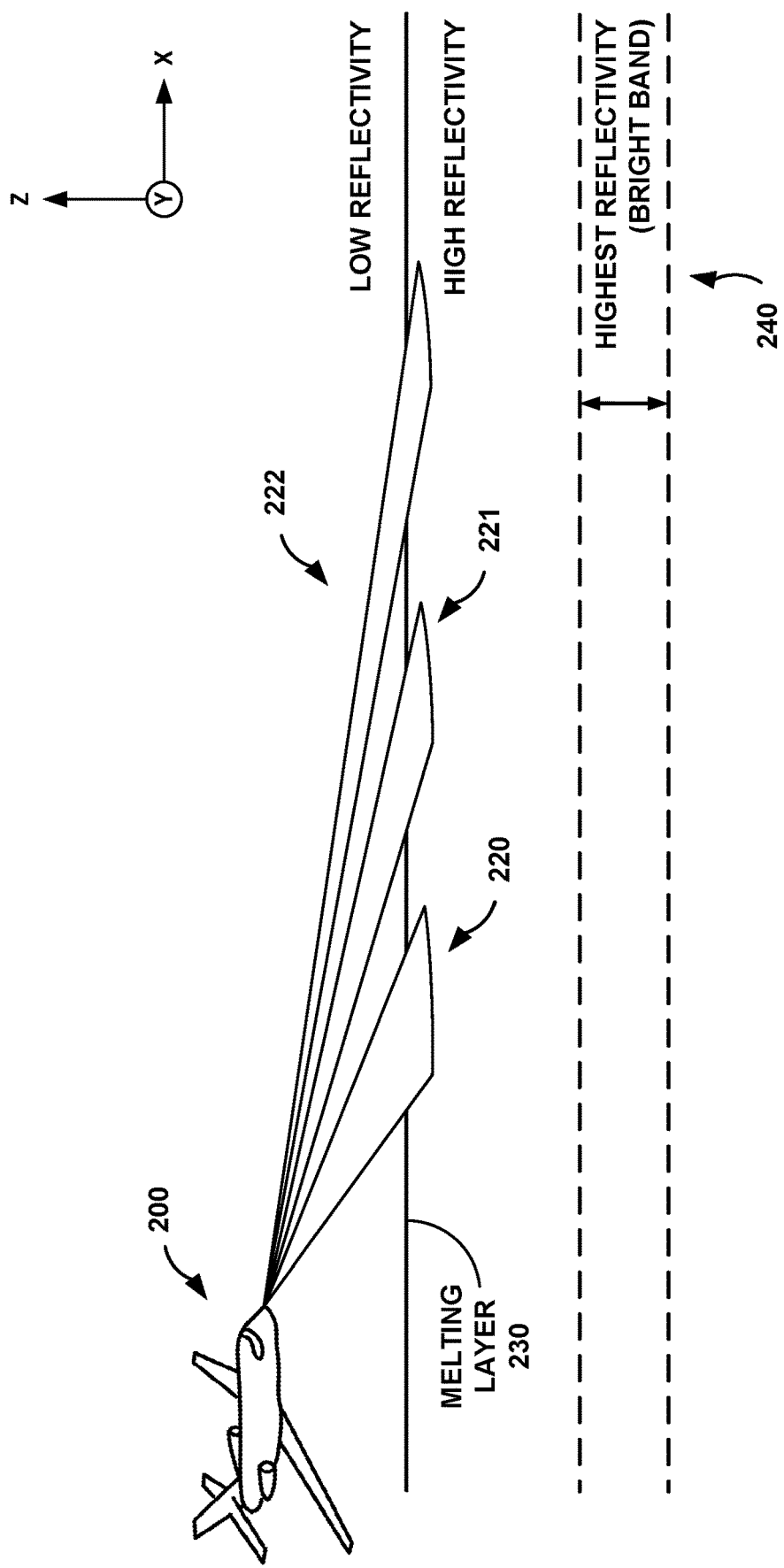
FIG. 2 shows a diagram of a vehicle transmitting and/or receiving three radar beams towards the melting layer, in accordance with some examples of this disclosure.
Figure 4:
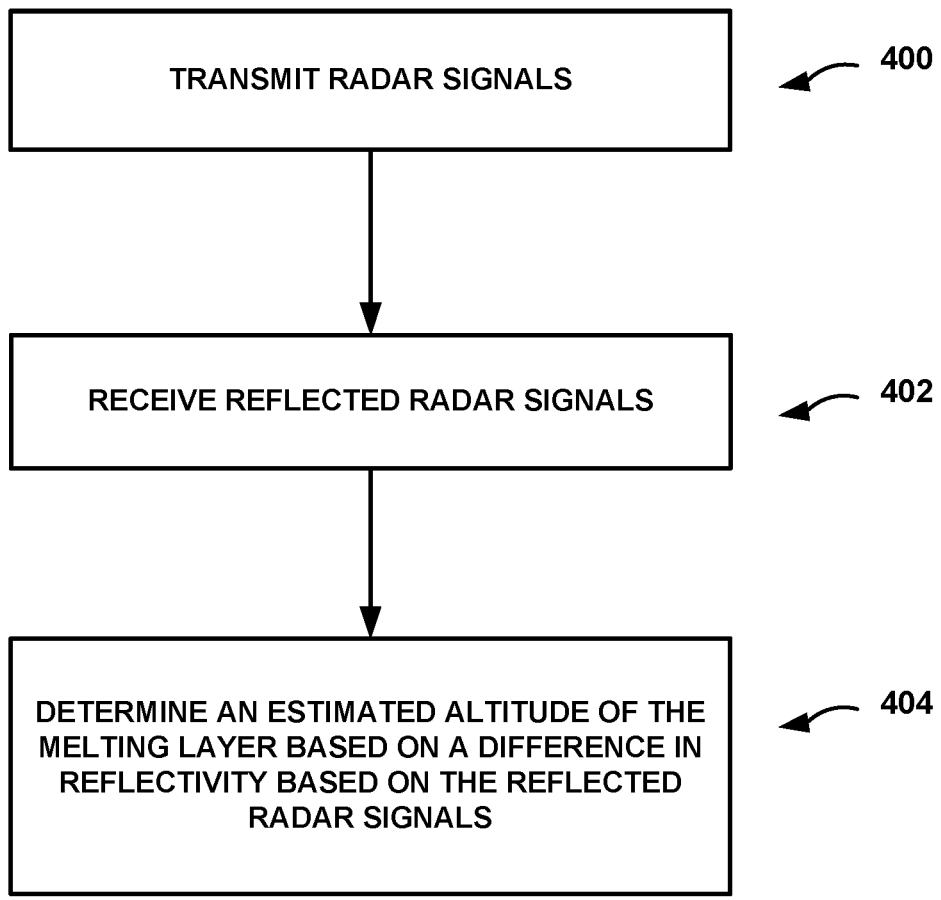
FIG. 4 shows a flowchart for example techniques for determining an estimated altitude of a melting layer, in accordance with some examples of this disclosure.

Processing circuitry 112 may be configured to determine an estimated altitude of a melting layer based on the reflectivity magnitude computed based on reflected radar signals 130-132 from a single beam. For example, processing circuitry 112 may be configured to determine the reflectivity magnitude of particles 140A at location A, the reflectivity magnitude of particles 140B at location B, and the reflectivity magnitude of particles 140C at location C. In some examples, each of locations A-C may be a single point or a volume with a height, a width, and a range. Thus, depending on its resolution, weather radar device 110 may be configured to detect the reflectivity of a volume in space rather than a single point or a single particle. Referring to FIGS. 2 and 4, the height of a volume of space may be measured in the z-axis direction, the width may be measured in the y-axis direction, and the depth may be measured in the x-axis direction.

Processing circuitry 112 may be configured to determine an estimated altitude of a melting layer based on the reflectivity magnitudes by at least determining a magnitude or a difference in reflectivity within a single beam. Processing circuitry 112 may be configured to determine the difference in reflectivity along a beam formed on receive by processing circuitry 112. For example, a first beam in FIG. 1 may include radar signal 120 and may have an elevation angle of twenty-six degrees below horizontal. Equation (1) defines the difference in reflectivity between particles 140A and particles 140B, where the difference in reflectivity may have the same units as the reflectivity. Particles 140A and particles 140B may be locations along a single beam formed by processing circuitry 112. If $Z_2$ is measured at a lower altitude than $Z_1$, then the difference in reflectivity may be a positive number when reflectivity increases at higher altitudes and a negative number when reflectivity decreases at higher altitudes.

Difference in reflectivity, $\Delta Z = Z_1 - Z_2$ (1)

Processing circuitry 112 may be configured to determine an altitude at which the difference in reflectivity or the rate of change in reflectivity is lowest (i.e., a negative number indicating reflectivity that declines with increasing altitude). For example, the difference in reflectivity across a first set of particles 140A and 140B along a first beam (e.g., the path of radar signals 120) may be lower than the difference in reflectivity across a second set of particles 140B and 140C along the first beam. In terms of Equation (1), $Z_{140A} - Z_{140B}$ may be lower than $Z_{140B} - Z_{140C}$ because particles 140A are at the highest altitude (e.g., may have the lowest reflectivity) and particles 140C are at the lowest altitude (e.g., may have a reflectivity that is similar to the reflectivity of particles 140B). As a result, processing circuitry 112 may be configured to determine that an estimated altitude of the melting layer for the first beam is in an altitude band spanning particles 140A and 140B. If the altitude difference between particles 140A and 140B is equal to the altitude difference between particles 140B and 140C, the rate of change in reflectivity across the first altitude band may be lower than the rate of change in reflectivity across the second altitude band.

In some examples, processing circuitry 112 may be configured to determine whether the difference in reflectivity or the rate of change in reflectivity across each altitude band within a single receive beam is less than a threshold level. In some examples, processing circuitry 112 may be configured to determine the estimated altitude of the melting layer in the highest altitude band across which the difference in reflectivity is less than a threshold level. As further explained with respect to FIG. 3, the melting layer may be at or near the highest altitude where the rate of change in reflectivity within a single beam is less than a threshold level.

According to equations (1) and (2), the difference in reflectivity and the rate of change in reflectivity in the melting layer may be a negative number because the magnitude of reflectivity decreases as altitude increases. Therefore, processing circuitry 112 may be configured to determine an estimated altitude of the melting layer where the difference in reflectivity and the rate of change in reflectivity is a relatively large negative number. The threshold level may be a relatively large negative number, where the difference in reflectivity and the rate of change in reflectivity at the melting layer is likely to be less than (or exceed in absolute terms) the threshold level.

Processing circuitry 112 may be configured to cause weather radar device 110 to transmit radar signals 120-123 as a single transmit beam or as three separate beams. Processing circuitry 112 may be configured to form beams based on at least some of reflected radar signals 130-132 at equal spacings (e.g., two- or three-degree increments). Processing circuitry 112 may be configured to determine a rate of change in reflectivity between two locations along a beam, $$\frac{\Delta Z}{\Delta h},$$

by dividing the difference in reflectivity between the two locations by the altitude difference or distance between the two locations, as shown in Equation (2). The rate of change may be an approximation of the first derivative of reflectivity by altitude, which holds that $$\lim_{\Delta h \to 0} \frac{\Delta Z}{\Delta h} = \frac{\partial Z}{\partial h}.$$

The range of altitudes between particles 140A and 140B may be referred to as an altitude band, where the altitude of particles 140A may be an upper altitude and the altitude of particles 140B may be a lower altitude. The altitude difference between particles 140A and 140B may be related to the distance between particles 140A and 140B and the angle of the beam, as shown below in Equation (3).

$$\text{Rate of change in reflectivity} = \frac{\Delta Z}{h_{140A} - h_{140B}} = \frac{\Delta Z}{\Delta h} \quad (2)$$

Figure 3:
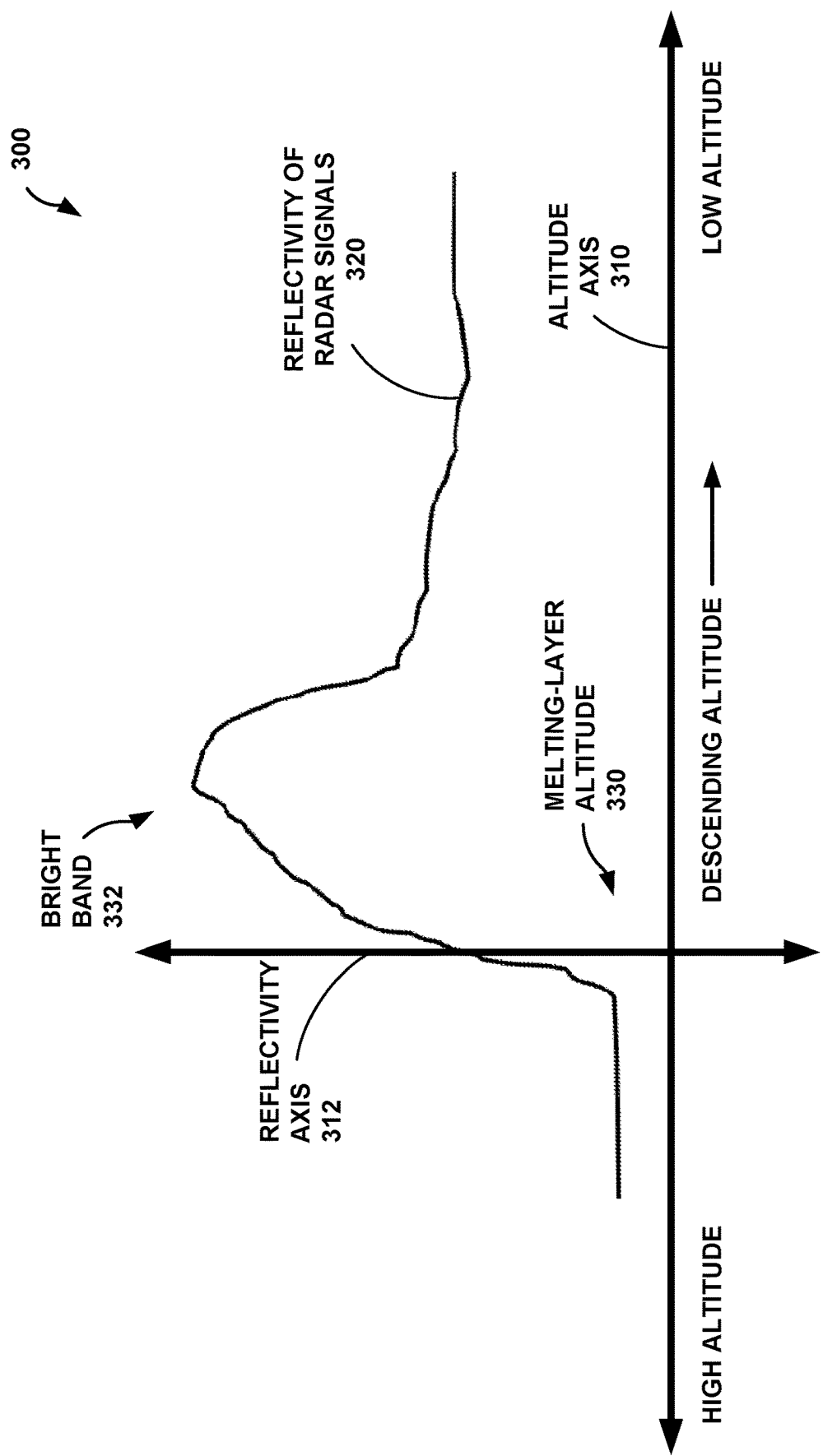
FIG. 3 shows an example graph of reflectivity and altitude, in accordance with some examples of this disclosure.

As shown in FIG. 3, an absolute value of the rate of change in reflectivity may be close to zero in the freezing zone at altitudes higher than the melting layer. The absolute value of the rate of change may be relatively large at altitudes near the melting layer and relatively small or zero in the bright-band altitudes where the reflectivity magnitudes are highest. The altitudes below the bright band may have moderate or small values of the absolute value of the rate of change in reflectivity. The altitudes farther below the bright band may have reflectivity difference closer to zero than the altitudes that are just below the bright band.

In some examples, system 100 may be mounted on a vehicle that is located at an altitude higher than the melting layer. Weather radar device 110 may be configured to detect reflectivity at altitudes lower than the altitude of the vehicle. For example, if the vehicle is an aircraft located at an altitude of thirty thousand feet, the melting layer may be located at ten thousand feet or twenty thousand feet or any other arbitrary altitude. Processing circuitry 112 may be configured to determine the air temperature outside of the vehicle and to determine an initial estimated altitude of the melting layer based on the air temperature and a lapse rate, which may be stored in memory device 114. For example, the lapse rate may be approximately five hundred feet per degree Celsius, and the air temperature outside the vehicle may be minus thirty degrees Celsius. Thus, processing circuitry 112 may determine that the initial estimated altitude of the melting layer is fifteen thousand feet below the altitude of the vehicle based on an algorithm that includes the lapse rate (i.e., a temperature change per change in altitude).

Based on determining that the initial estimated altitude of the melting layer is below the altitude of the vehicle, processing circuitry 112 may be configured to cause weather radar device 110 to transmit radar signals at a downward angle towards the initial estimated altitude of the melting layer. If the initial estimated altitude of the melting layer is above the altitude of the vehicle, processing circuitry 112 may be configured to cause weather radar device 110 to transmit radar signals at an upward angle. Processing circuitry 112 may be configured to determine the final estimated altitude of the melting layer based on at least some of radar signals 120-122 transmitted at the downward angle that are reflected back as radar signals 130-132 to weather radar device 110.

In some examples, processing circuitry 112 may be configured to determine a bright-band altitude at or near an altitude that has the highest magnitude of reflectivity. At the bright-band altitude, water molecules may be partially frozen and partially melted, resulting in a higher reflectivity than completely frozen molecules or completely melted water molecules. Processing circuitry 112 may be configured to determine the estimated altitude of the melting layer at an altitude that is higher than the bright-band altitude. Processing circuitry 112 may be configured to set the bright-band altitude as a lower bound and to determine the estimated altitude of the melting layer based on the highest absolute value of the rate of change in reflectivity above the bright-band altitude (e.g., the lowest rate of change in reflectivity).

Each of particles 140A-140C, 141A-141C, and 142A-142C may be a distribution of particles, such as any mobile object or remote object such as water molecules, a speck of dust, and/or any other particle. Particles 140A-140C, 141A-141C, and 142A-142C may be anything that reflects radar signals 120. In some examples, particles 140A-140C, 141A-141C, and 142A-142C may be liquid water particles, frozen water particles such as ice crystals, hail, or snowflakes, and/or partially frozen or partially melted water particles.

In accordance with the techniques of this disclosure, processing circuitry 112 may be configured to determine an estimated altitude of the melting layer based on at least one beam determined based on reflected radar signals 130-132. Processing circuitry 112 may be configured to determine the estimated altitude of the melting layer at altitude where the absolute value of the rate of change in reflectivity is highest, or where the rate of change in reflectivity is lowest, for each beam formed by processing circuitry 112 on receive. Processing circuitry 112 may then be configured to determine an average estimated altitude of the melting layer by averaging the estimated altitudes for each beam. An accurate determination of the estimated altitude of the melting layer may be desirable because ice crystals may be present at or just above the melting layer. Ice crystals may be hazardous to vehicles, including the engines, sensors, and probes onboard the vehicles. In particular, high-performance engines may be especially vulnerable to ice crystals. Therefore, an accurate determination of the estimated altitude of the melting layer may improve vehicle safety by improving the detection of ice crystals.

FIG. 2 shows a diagram of a vehicle 200 transmitting and/or receiving three radar beams 220-222 towards the melting layer 230, in accordance with some examples of this disclosure. FIG. 2 depicts vehicle 200 as an aircraft, but vehicle 200 may be any vehicle such as a helicopter, a weather balloon, a space vehicle such as a satellite or spaceship, a land vehicle such as an automobile, and/or a water vehicle such as a ship or a submarine. In some examples, a system of this disclosure may be mounted or positioned in a non-mobile place such as a stationary weather radar or an observatory. If vehicle 200 is an aircraft, vehicle 200 may typically fly at thirty-five thousand feet or forty thousand feet, and melting layer 230 may typically exist at approximately fifteen thousand feet or twenty thousand feet.

In accordance with the techniques of this disclosure, a weather radar device onboard vehicle 200 may be configured to transmit radar signals and receive radar beams 220-222. In some examples, radar beams 220-222 may be vertically stacked radar beams with the same azimuth angle and different elevation angles. In other examples, radar beams 220-222 may not have the same azimuth. In some examples, radar beams 220-222 may have the same azimuth angle but different vertical angles or elevation angles that extend in the z-axis direction. For example, each of radar beams 220-222 may be separated by two or three degrees, such that radar beam 220 may be oriented at twenty-four degrees below horizontal, radar beam 221 may be oriented at twenty-two degrees below horizontal, and radar beam 222 may be oriented at twenty degrees below horizontal. Radar beams 220-222 may also be oriented at twenty-five degrees, twenty-two degrees, and nineteen degrees below horizontal. In some examples, the processing circuitry may be configured to form more or fewer than three beams based on the reflected radar signals.

In some examples, the weather radar device onboard vehicle 200 may be configured to transmit radar signals in a single transmit beam or a series of transmit beams. The weather radar device may be a phased-array radar device that is configured to receive the reflected radar signals and process the reflected radar signals by at least determining multiple simultaneous beams of reflected radar signals. The processing circuitry may be configured to determine multiple simultaneous beams by determining vertically stacked beams, where each beam has the same azimuth angle. The weather radar device may be configured to determine radar beams by determining parameters of the reflected radar signals such as phase shift, time of arrival, signal strength, and/or any other signal characteristics.

The processing circuitry onboard vehicle 200 may be configured to determine an estimated altitude of melting layer 230 by at least determining an estimated altitude of melting layer 230 for each beam of vertically stacked radar beams 220-222. For example, the processing circuitry may be configured to determine the reflectivity magnitudes for locations or volumes of space along each of radar beams 220-222 and the rates of change in reflectivity for locations along each of radar beams 220-222. At a given range along beam, the difference in reflectivity between two locations along the beam may be less than the threshold level, where the threshold level is a negative number indicating that reflectivity around the melting layer is inversely proportional with altitude. The difference in reflectivity between locations along radar beam 220 may not exceed the threshold level. Thus, the processing circuitry may be configured to determine melting layer 230 at an altitude or an altitude band spanning two locations along radar beam 220 with the lowest rate of change in reflectivity (e.g., the highest absolute value). The altitude difference between the weather radar device and the particle being sensed is shown in Equation (3), where the range is the distance between the weather radar device and the particle, and θ is the angle of the transmitted radar signal.

$$\text{altitude difference, } \Delta h = h_1 - h_2 = \text{range} \times \sin\theta \quad (3)$$

In some examples, the processing circuitry onboard vehicle 200 may be configured to determine an estimated altitude of the melting layer within at least one additional beam to increase the accuracy of the estimated altitude. FIG. 2 illustrates two additional beams 221 and 222. In the examples described above, the processing circuitry used beam 220 to estimate an altitude for the melting layer between two locations along beam 220. The processing circuitry may also be configured to determine an estimated altitude along beams 221 and 222 based on the reflected radar signals in beams 221 and 222. In some examples, the processing circuitry may be configured to average the melting layer altitude estimated from multiple beams to improve the estimate. Thus processing circuitry may be configured to average the melting layer altitude estimates from each of beams 220-222. The processing circuitry may be configured to form an arbitrary number of beams such as two, three, four, or more. In some examples, the processing circuitry may use additional beams only to confirm that the melting layer altitude estimated from beam 220 is consistent with melting layer altitudes estimated from other beams.

Melting layer 230 may be located at or near the transition between low reflectivity magnitudes and high reflectivity magnitudes. Bright band 240 may have the highest reflectivity magnitudes, as compared to the reflectivity magnitude at other altitudes. Water molecules in bright band 240 may be frozen and/or liquid. Liquid water on the surfaces of hail, ice, and/or snow in bright band 240 may have higher reflectivity magnitudes than completely frozen water or completely melted water. The altitudes in bright band 240 may be lower than the altitude of melting layer 230.

FIG. 3 shows an example graph 300 of reflectivity and altitude, in accordance with some examples of this disclosure. On the high-altitude side of graph 300, reflectivity 320 of the radar signals may be relatively low at altitudes that are higher than melting-layer altitude 330. Reflectivity 320 of radar signals in bright band 332 may be relatively high, as compared to all of the other altitudes shown on graph 300. Graph 300 of reflectivity 320 may represent the reflectivity along one receive beam of radar signals.

Reflectivity 320 of radar signals at melting-layer altitude 330 may be lower, as compared to bright band 332, but the rate of change of reflectivity 320 may be the lowest at melting-layer altitude 330 (i.e., highest absolute value). The rate of change in reflectivity 320 may be lowest at melting-layer altitude 330 because of the transition between relatively low-reflectivity ice crystals and relatively high-reflectivity partially-melted and partially-frozen water particles. On the low-altitude side of graph 300, reflectivity 320 of the radar signals may have moderate reflectivity magnitudes at altitudes that are lower than bright band 332.

A system of this disclosure may be configured to determine an estimated melting-layer altitude 330 based on reflectivity 320. The processing circuitry may be configured to determine melting-layer altitude 330 based on the lowest rate of change in reflectivity 320 or the altitude at which the rate of change in reflectivity 320 is less than a threshold level. The rate of change in reflectivity 320 may be the first derivative of reflectivity 320 along reflectivity axis 312 with respect to the altitude along altitude 310, as shown above, where Z is reflectivity 320 and h is altitude.

In some examples, the processing circuitry may be configured to determine the estimated altitude of the melting layer by finding the altitude at which the second derivative of reflectivity 320 with respect to altitude is zero and the first derivative of reflectivity 320 is negative, as shown in Equation (4). The second derivative may equal zero at an altitude with either the highest or the lowest rate of change in reflectivity 320. More than one altitude on graph 300 may have a second derivative of reflectivity 320 equal to zero. Therefore, the processing circuitry may be configured to determine melting-layer altitude 330 at the first altitude higher than bright band 332 at which the second derivative of reflectivity 320 with respect to altitude is zero and the rate of change in reflectivity is negative.

$$\text{altitude of melting layer may occur where } \frac{\partial^2 Z}{\partial h^2} = 0 \text{ and } \frac{\partial Z}{\partial h} < 0 \quad (4)$$

The second derivative of reflectivity 320 may equal zero where the rate of change in reflectivity 320 is either highest or lowest. The processing circuitry may be configured to determine melting-layer altitude 330 where the rate of change in reflectivity 320 is less than a threshold level, which may be expressed in units of Z per meter or dBZ per meter. In some examples, the processing circuitry may be configured to determine melting-layer altitude 330 where the rate of change in reflectivity 320 achieves a maximum absolute value at an altitude above bright band 332.

The processing circuitry may determine that the air temperature at the ownship vehicle is less than zero degrees Celsius. Using the air temperature at the ownship vehicle and a lapse rate, the processing circuitry may determine an initial estimate of the melting-layer altitude. The processing circuitry may be configured to cause the weather radar device of the ownship vehicle to transmit and receive radar beams towards the initial estimate of the melting-layer altitude. In some examples, the processing circuitry may be configured to cause the weather radar device to process reflected radar signals by at least determining received radar beams towards the initial estimate of the melting-layer altitude. Based on the reflected radar signals, the processing circuitry may be configured to determine a final estimated altitude of the melting layer within an altitude band along a single beam that has a difference in reflectivity or a rate of change in reflectivity that is less than a threshold level.

In some examples, the processing circuitry may be configured to determine the final estimated altitude of the melting layer for the single beam within the altitude band with a rate of change that is less than the threshold level (i.e., the target altitude band) based on the rates of change of nearby altitude bands. For example, if the altitude band just below the target altitude band has a higher absolute value of the rate of change than the altitude band just above the target altitude band, the processing circuitry may be configured to determine the final estimated altitude of the melting layer at the lower end of the target altitude band. In some examples, the processing circuitry may be configured to determine the final estimated altitude of the melting layer at the highest altitude band that is lower than the altitude of vehicle at which the difference in reflectivity or the rate of change in reflectivity is less than a threshold level.

As one example, the processing circuitry may determine five vertically stacked receive beams at downward angles of twenty degrees, twenty-two degrees, twenty-four degrees, twenty-six degrees, and twenty-eight degrees. This example includes relatively large steering angles and piles a number of beams within close proximity to the other beams (e.g., two-degrees of separation). This close stacking of beams allows the processing circuitry to perform a repetitive measurement of the melting layer location across the five beams.

The processing circuitry may be configured to measure the melting layer independently with the same range precision. The processing circuitry may then be configured to determine an estimated altitude of the melting layer for the first beam at twenty degrees, an estimated altitude of the melting layer for the second beam at twenty-two degrees, and so on. The processing circuitry may be further configured to determine an average estimated altitude by averaging the five estimated altitudes for the five beams.

If four of the five estimated altitudes are between twenty thousand feet and twenty-five thousand feet, and the fifth estimated altitude is at thirteen thousand feet, the processing circuitry may be configured to determine that the fifth estimated altitude is an outlier. The processing circuitry may determine that an estimated altitude is an outlier based on the number of standard deviations between the average estimated altitude and the fifth estimated altitude. The processing circuitry may be configured to remove the fifth estimated altitude and re-determine the average estimated altitude based on averaging the four remaining estimated altitudes.

In some examples, the weather radar device of vehicle may have the following specifications: a pulse length of three microseconds such that the blind range is four hundred and fifty meters, or about seven seconds of flight time at one hundred and forty miles per hour (i.e., about two hundred and twenty-five kilometers per hour); a minimum pulse repetition interval (PRI) of 1.054 milliseconds and a maximum pulse repetition frequency (PRF) of nine hundred and forty-nine Hertz; thirty-four pulses on target within the main beam, for a processing gain of 15.3 decibels; and a single pulse detection probability of ninety percent; probability of false alarms of one in one million. The pulse length may be variable based on the altitude of vehicle.

It may be important for the weather radar device to look down at a fairly steep angle so that the radar beams will cut through the melting layer at a relatively sharp angle. Steep angles may be angles that are more than ten, fifteen, twenty, or even more than twenty degrees below horizontal. If the weather radar device uses angles that are flat or grazing, such as angles of less than ten degrees, the receive beams may experience blurring. If the beam angle hits the melting layer at a very shallow angle such as less than five or ten degrees, the processing circuitry may have difficulty determining the actual range to the melting layer. Using more acute angles, the processing circuitry may be able to make a far more discrete observation, as compared to shallower angles.

FIG. 4 shows a flowchart for example techniques for determining an estimated altitude of a melting layer, in accordance with some examples of this disclosure. The techniques of FIG. 4 are described with reference to system 100 of FIG. 1, including weather radar device 110 and processing circuitry 112, although other components may perform similar techniques.

In the example of FIG. 4, weather radar device 110 may be configured to transmit radar signals 120-123 (400). Weather radar device 110 may be configured to transmit radar signals 120-123 using an electronically steered radar that includes an array of antennas. In some examples, weather radar device 110 may transmit more or fewer radar signals than depicted in FIG. 1. Weather radar device 110 may be configured to control the angle of each radar signal by controlling the phase shift across the array of antennas.

In the example of FIG. 4, weather radar device 110 may be configured to receive reflected radar signals 130-132 (402). In some examples, processing circuitry 112 may be configured to determine one or more beams on receive based on reflected radar signals 130-132. Processing circuitry 112 may form more or fewer than three beams on receive at any time. Processing circuitry 112 may be configured to determine the range of each of particles 140A-140C, 141A-141C, and 142A-142C based on the time duration between transmission of radar signals 120, for example, and receipt of radar signals 130. Processing circuitry 112 may also be configured to determine the angle of receipt based on the phase shift across the antenna array of weather radar device 110. Processing circuitry 112 may be configured to determine the altitudes of particles 140A-140C, 141A-141C, and 142A-142C based on Equation (3) and the altitude of weather radar device 110.

In the example of FIG. 4, processing circuitry 112 may be configured to determining the estimated altitude of the melting layer based on a difference in reflectivity based on the reflected radar signals 130-132 (404). Processing circuitry 112 may be configured to determine the reflectivity magnitudes of reflected radar signals 130-132. In some examples, processing circuitry 112 may be configured to determine an altitude band at which the difference in reflectivity or the rate of change reflectivity of particles 140A-140C, 141A-141C, and 142A-142C is less than a threshold level. The altitude band may span two altitudes along a single beam. Processing circuitry 112 may be further configured to average the estimated altitudes of the melting layer from multiple receive beams.

FIGS. 5-9 depict example hardware configurations for weather radar device 110. In some examples, weather radar device 110 may be configured to operate in FMCW and/or pulsed mode. Additionally or alternatively, weather radar device 110 may also include other hardware configurations. Example details of weather radar devices may be found in U.S. patent application Ser. No. 14/488,129 filed on Sep. 16, 2014, entitled "Digital Active Array Radar" and U.S. patent application Ser. No. 14/488,154 filed on Sep. 16, 2014, entitled "Digital Active Array Radar," which are incorporated herein by reference in their entirety.

Figure 5:
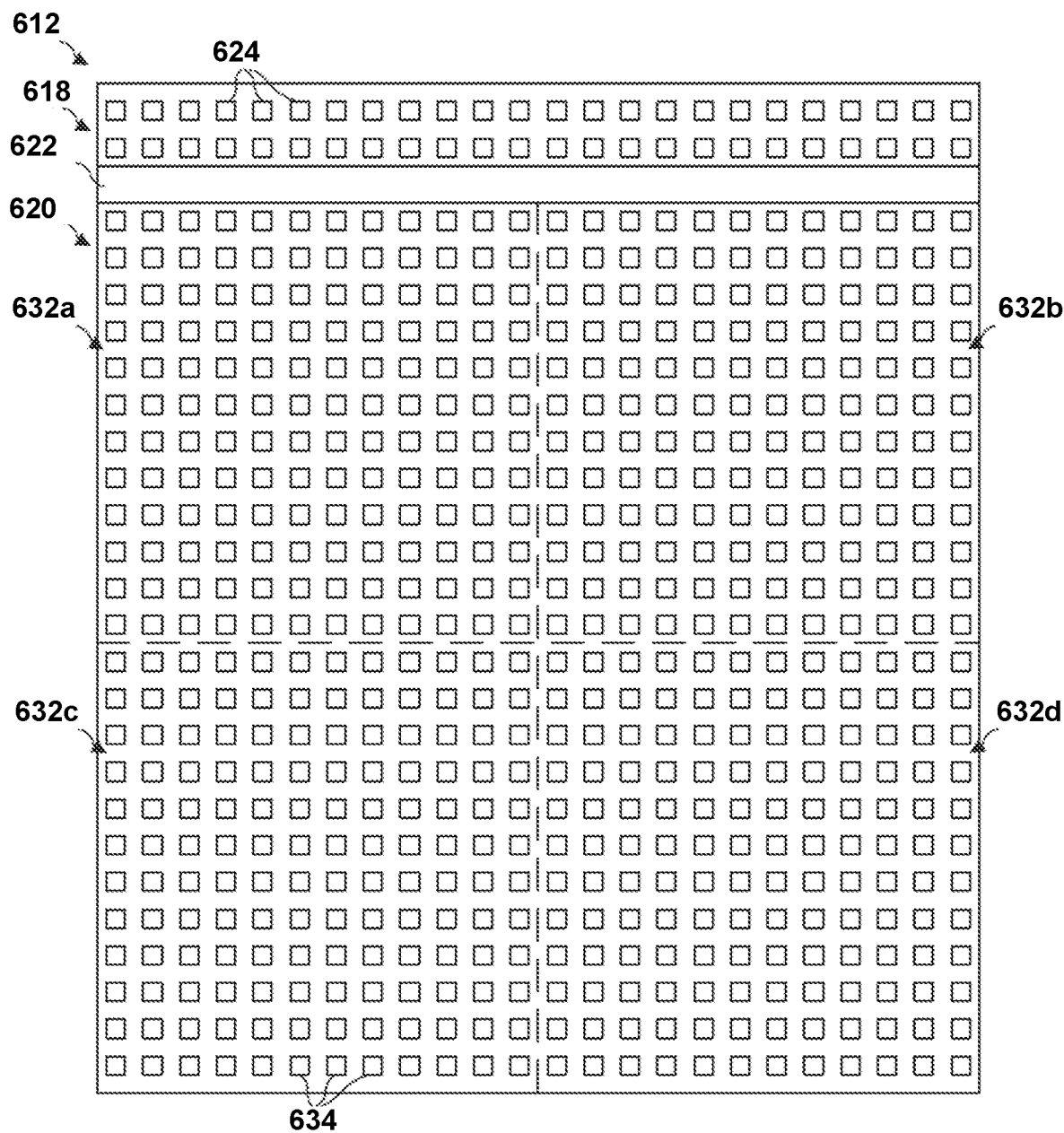
FIG. 5 is a conceptual diagram illustrating an example FMCW radar array.

FIG. 5 is a conceptual diagram illustrating an example FMCW radar array 612. FMCW radar array 612 includes a transmit array 618 and a receive array 620. The example of FMCW radar array 612 shown in FIG. 5 also includes electronic bandgap (EBG) isolator 622 disposed between the transmit antenna and the receive antenna. Transmit array 618 and receive array 620 are physically proximate to each other, e.g., located in a single housing such as housing 713 shown in FIGS. 6 and 7.

Transmit array 618 includes a plurality of transmit antenna elements 624. In some examples, transmit array 618 includes two rows (oriented horizontally in the example of FIG. 5) of transmit antenna elements 624, and each row includes twenty-four transmit antenna elements 624. In general, transmit array 618 may include at least one row of transmit antenna elements 624, and each row may include a plurality of antenna elements 624. In some examples, adjacent transmit antenna elements 624 may be spaced apart in the horizontal direction by approximately one-half of the wavelength of the transmit beam generated using transmit array 618.

As shown in FIG. 5, receive array 620 may be conceptually divided into quadrants 632a, 632b, 632c, 632d (collectively, "quadrants 632"). In some examples, receive array 620 is also electrically divided into quadrants 632, e.g., based on the electrical connections of the receive antenna elements 634 to receive electronics that process the signals detected by receive antenna elements 634. Receive signals from each of receive antenna elements 634 may be used to generate monopulse tracking beams using monopulse beam arithmetic, and dividing receive array 620 into quadrants 632 may facilitate generation of monopulse tracking beams, as described below. In some examples, each of quadrants 632 includes the same number of receive antenna elements 634. For example, in the implementation shown in FIG. 5, each of quadrants 632 includes twelve rows of twelve receive antenna elements 634, for a total of one hundred and forty-four receive antenna elements 634 in each of quadrants 632 (each row is oriented horizontally and each column is oriented vertically in the example of FIG. 5). In other examples, each of quadrants 632 may include twelve rows of receive antenna elements 634, each row including twelve receive antenna elements 634 (for a total of one hundred and forty-four receive antenna elements in each of quadrants 632). Hence, in the illustrated example, receive array 620 includes twenty-four rows of receive antenna elements 634, and each row includes twenty-four receive antenna elements 634.

In other examples, receive array 620 may include a different number of receive antenna elements 634. For example, receive array 620 may include more or fewer rows of receive antenna elements 634, and each row may include more or fewer receive antenna elements 634 than depicted in FIG. 5. In general, receive array 620 may include a plurality of rows of receive antenna elements 634 and each row may include a plurality of receive antenna elements 634. In some examples, adjacent receive antenna elements 634 may be spaced apart in the horizontal direction by approximately one-half of the wavelength of the transmit beam generated using transmit array 618.

In some examples, receive antenna elements 634 may be arranged in a square array of receive antenna elements 634 (e.g., the number of rows of receive antenna elements 634 is the same as the number of receive antenna elements 634 in each row). In other examples, receive antenna elements 634 may be arranged in a rectangular arrant of receive antenna elements 634 (e.g., the number of rows of receive antenna elements 634 is different than the number of receive antenna elements 634 in each row). Additionally or alternatively, in some examples, the number of receive antenna elements 634 in a row of receive array 620 may be different than the number of transmit antenna elements 624 in a row of transmit array 618. Alternatively, or additionally, receive antenna elements 634 may not be arranged in rows and columns as depicted in FIG. 5; instead, receive antenna elements 634 may be arranged in another geometric or non-geometric array.

Figure 6:
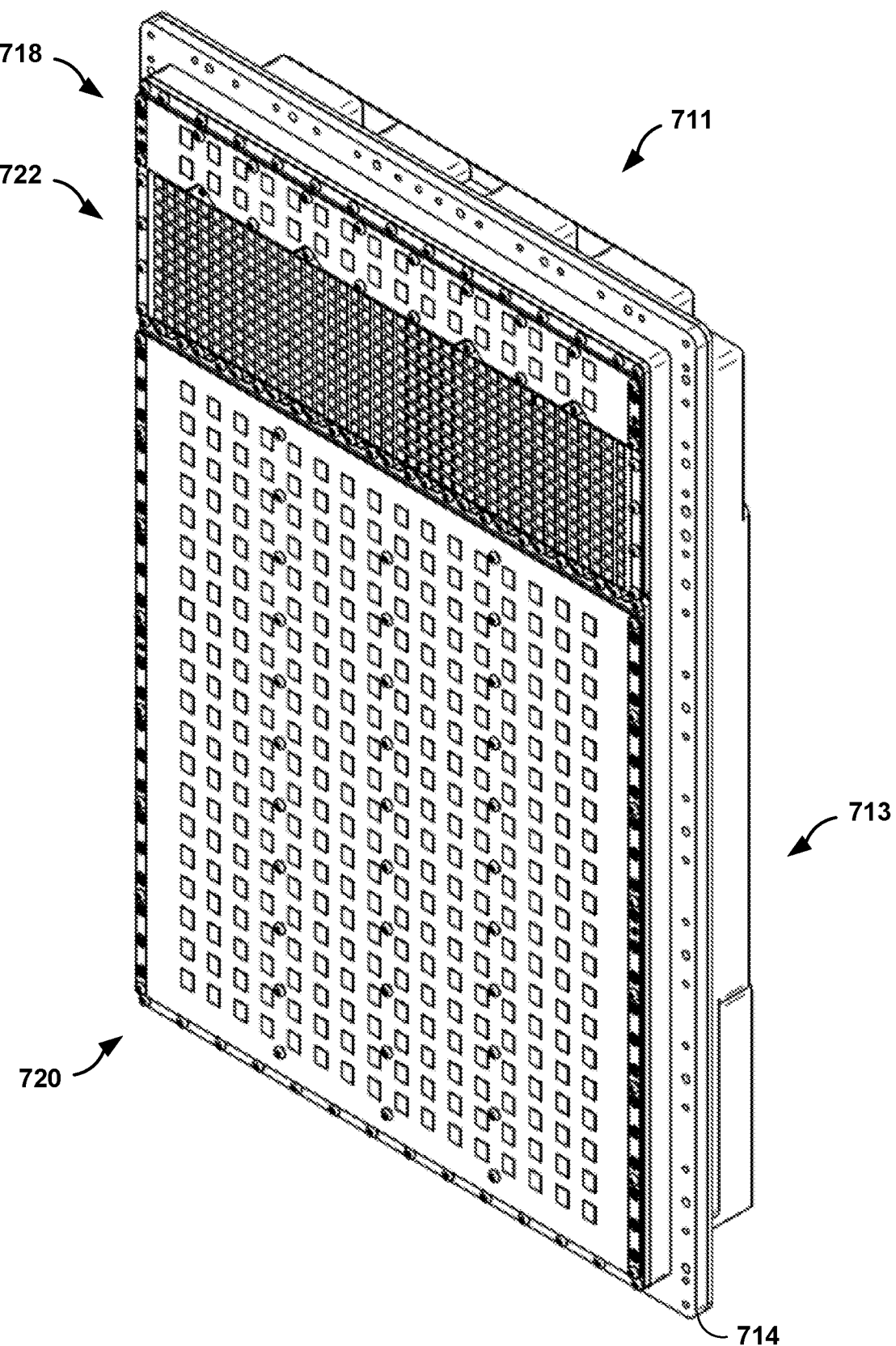
FIGS. 6 and 7 are front- and back-view diagrams of an example FMCW radar device.
Figure 7:
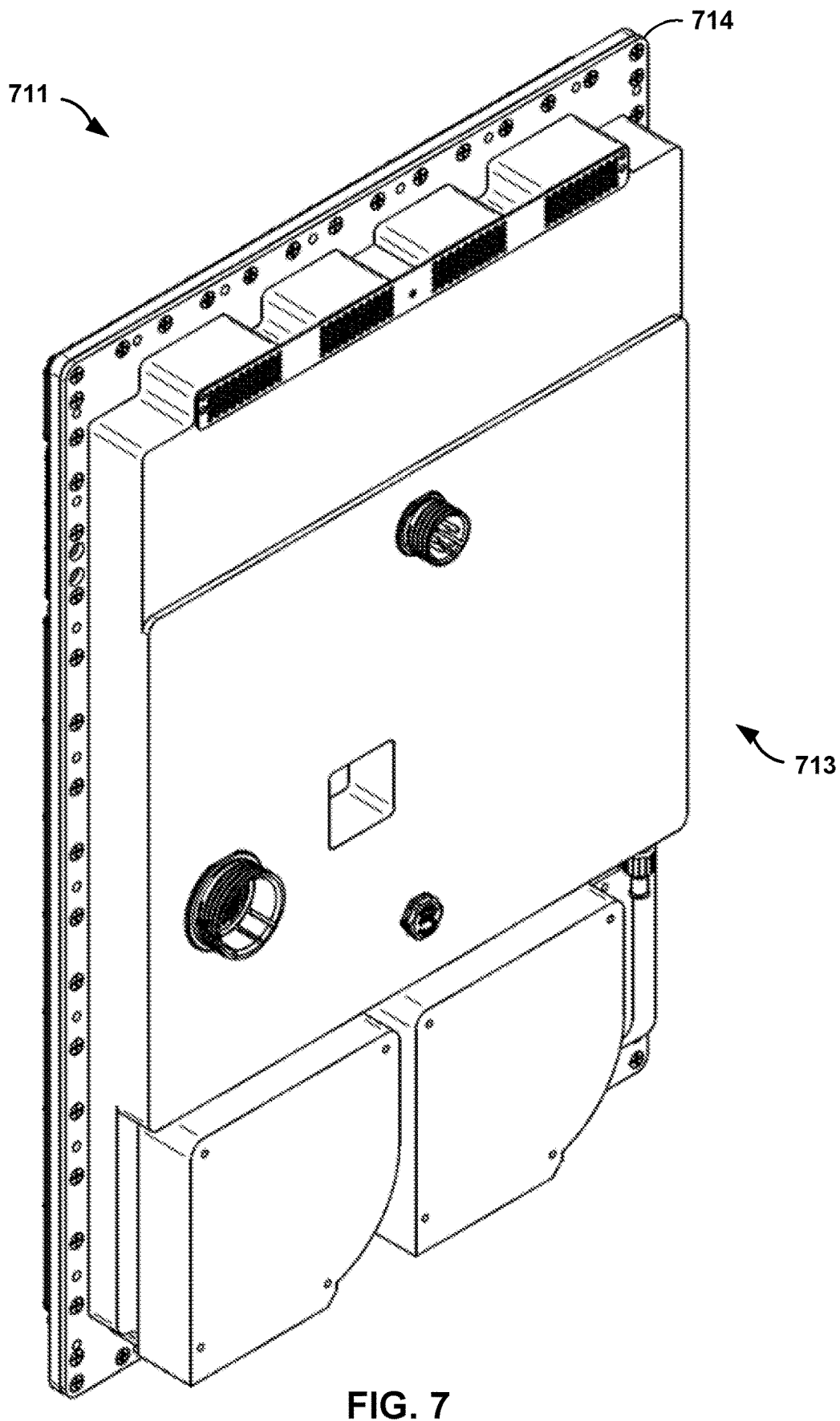

FIGS. 6 and 7 are front- and back-view diagrams of an example FMCW radar device. In some examples, phased-array radar panel 711 may include a plurality of printed circuit boards disposed substantially parallel to each other and to the front surface of phased-array radar panel 711. In some examples, the top layer printed board may be referred to as a patch layer, and may include antenna elements, such as transmit array 718, EBG isolator 722 and receive array 720 and radio frequency components. Transmit array 718 and receive array 720 may be similar or the same as the array of integrated radar device 811 depicted in FIGS. 8A and 8B. In the example of FIGS. 6 and 7, EBG isolator 722 is disposed between the transmit antenna array 718 and the receive antenna array 720. In some examples, EBG isolator 722 may be a printed array of resonant patch elements having dimensions selected to provide cancellation of electromagnetic radiation from the frequency modulated continuous wave transmit beam to reduce a magnitude of radiation from transmit array 718 to which receive array 720 is indirectly exposed. In other words, EBG isolator 722 may isolate transmit array 718 from receive array 720. The components of phased-array radar panel 711 may be a single, integrated package.

In some examples, other printed boards (not shown in FIGS. 6 and 7) may include digital and frequency synthesizer components, including devices, such as field programmable gate arrays (FPGAs) that control scanning and beamforming on receive. Some additional printed circuit boards may include power supply components and additional signal processing components, along with an interface for connecting phased-array radar panel 711 to other FMCW radar arrays and/or components of the aircraft or device on which phased-array radar panel 711 is utilized. In some examples, multiple FMCW radar arrays may be connected to common control electronics, which may control operation of the FMCW radar arrays, including, for example, radar pulse synchronization, scanning frequencies, target tracking, or the like.

The printed circuit boards, transmit array 718 and receive array 720 are physically proximate to each other, e.g., located in a single housing 713. For example, the patch layer, heatsink 714 and the cover may be considered a housing, similar or the same as housing. The printed circuit boards, including the patch layer may include components, such as processing circuitry 112 and memory device 114 in relation to FIG. 1, for an FMCW radar device and located in single housing.

In some examples, a proposed system may be a continuous wave radar device that transmits one hundred percent of the time at a power level of approximately thirty watts. The phased-array radar device may be configured to use a total input power of approximately five hundred and fifty watts for three faces. The top transmit element rows use transmitter parts, while the remaining receive element rows use receive only parts. This configuration may reduce costs by reducing the number of high-cost transmit components.

Figure 8A:
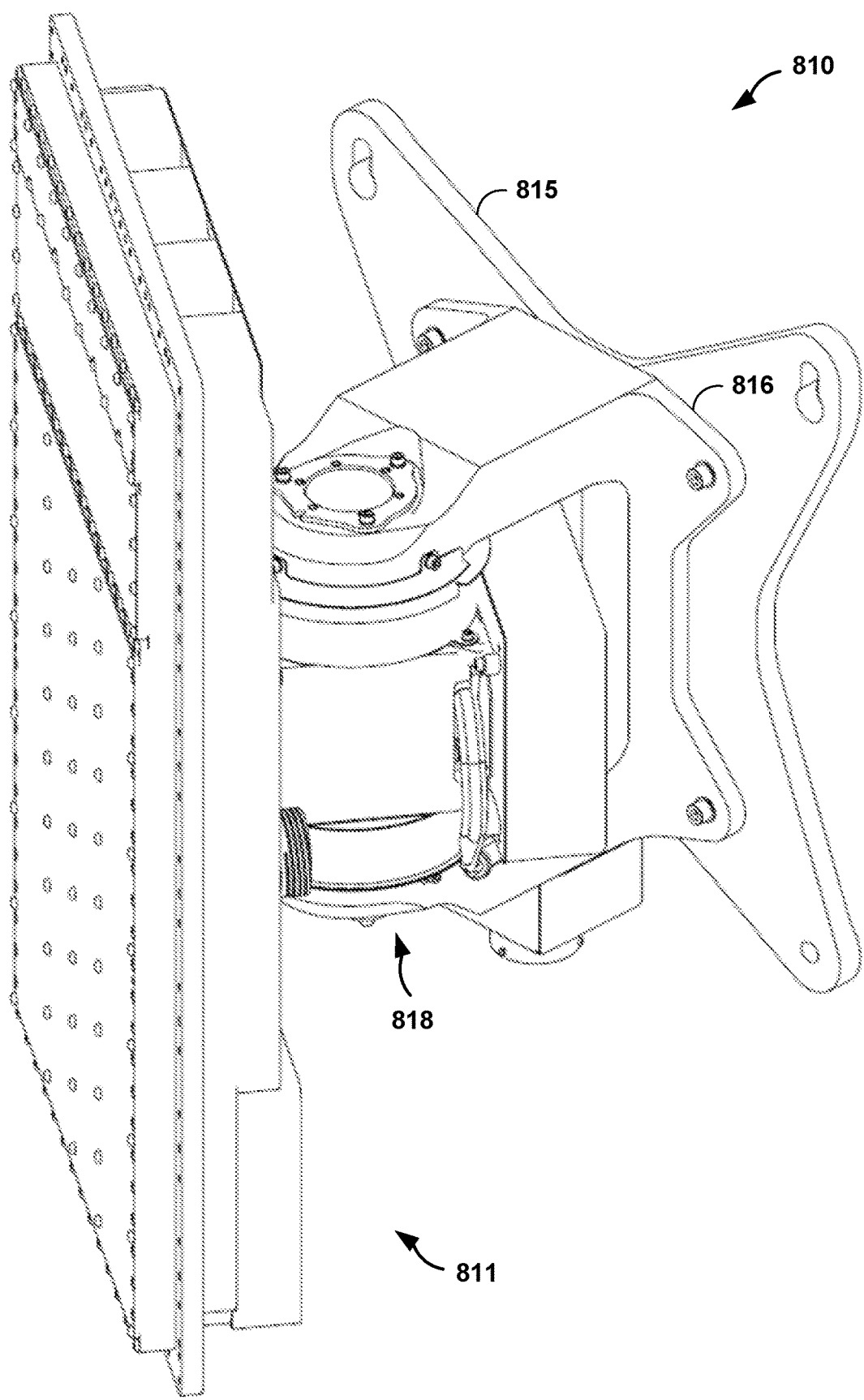
FIGS. 8A and 8B are diagrams of an example FMCW radar device mounted to allow mechanical scanning in azimuth.
Figure 8B:
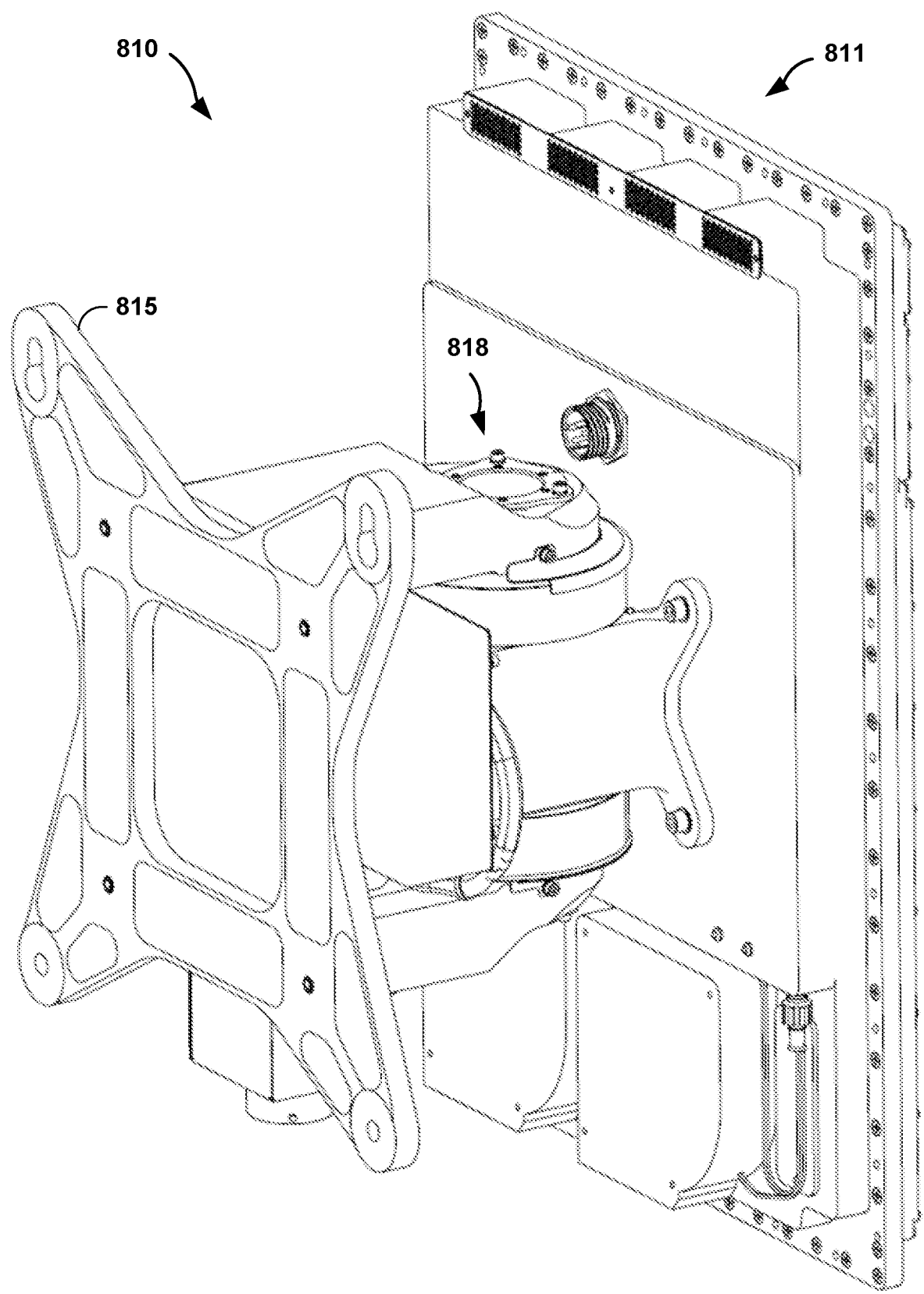

FIGS. 8A and 8B are diagrams of an example FMCW radar device mounted to allow mechanical scanning in azimuth. Mechanical scanning in azimuth may provide a wider field of regard. Radar apparatus 810 includes integrated radar device 811 (e.g., a phased-array radar panel) supported by gimbaled mount 815. Though radar apparatus 810 may be used in a variety of applications, this disclosure will focus on the application as a weather radar in an aircraft, to simplify and clarify the description.

Integrated radar device 811 of radar apparatus 810 outputs an FMCW transmit beam and may electronically steer the FMCW transmit beam in azimuth, e.g. the horizontal direction with respect to the ground. Integrated radar device 810 may receive a plurality of receive signals reflected from objects or weather within the FOR of integrated radar device 810. Integrated radar device 810 may digitally generate, using the plurality of receive signals, a plurality of receive beams within the area illuminated by the FMCW transmit beam.

Gimbaled mount 815 may mechanically scan integrated radar device 810 in azimuth, which extends the angular range of coverage for the electronic scan of integrated radar device 810. In some examples, gimbaled mount 815 may receive a position signal and rotate and aim integrated radar device 810 in response to the position signal. In other words, gimbaled mount 815 is configured to mechanically move the integrated radar device to various positions in the second illumination direction. In this manner, radar apparatus 810 may cover a larger field of regard than a single integrated radar device could cover by electronic scanning alone.

FIG. 8A depicts radar apparatus 810, which includes integrated radar device 811 supported by gimbaled mount 815, which perform the same functions as described above. FIG. 8A further depicts mounting portion 816 and rotatable housing 818 of gimbaled mount 815. Mounting portion 816 is one example of a mounting portion of a gimbaled mount 815 that may attach radar apparatus 810 to, for example, within the nose radome of an aircraft or a UAV. Mounting portion 816 may be configured to support radar apparatus 810 during operations where radar apparatus 810 may encounter vibration, acceleration forces, turning forces and similar stresses.

Housing 818 may rotate in relation to mounting portion 816, for example, in response to a position signal that causes gimbaled mount 815 to mechanically rotate integrated radar device 811 to one or more angular positions. Housing 818 may include one or more motors (not shown in FIGS. 8A and 8B) that are configured to rotate integrated radar device 810. The one or more motors may be controlled by electronic circuitry within integrated radar device 810. In other examples, the one or more motors may receive control signals from other circuitry, such as circuitry within a radar display and control unit (not shown in FIGS. 8A and 8B). A radar display and control unit may be mounted in a vehicle, such as the cockpit of an aircraft, and display objects and weather detected by radar apparatus 810.

Housing 818 may also include a coiled cable, the coiled cable comprising a plurality of conductors (not shown in FIGS. 8A and 8B). In some examples, the coiled cable may be configured to electrically connect the integrated radar device to the mounting portion and further to the radar display and control unit. The coiled cable may carry electrical power and signals to and from integrated radar device 811. For example, the coiled cable may carry control signals from the radar display and control unit to change the electronic scan pattern of the FMCW transmit beam. The coiled cables may carry signals to the one or more motors to cause gimbaled mount 815 to rotate integrated radar device 810 in the second illumination direction.

The coiled cable may, in some examples, be referred to as a clock spring cable, because the coiled cable may have a shape similar to a clock spring. Other examples may include a multi-pass box spring cable and a single pass flat ribbon cable. In some examples, housing 818 may include multiple, redundant coiled cables to improve reliability. Housing 818, the motors described above, or other components of radar apparatus 810 may provide position feedback to determine the angular position of integrated radar device 811.

In operation, integrated radar device 811 may be configured to electronically scan the FMCW transmit beam in the second illumination direction when gimbaled mount 815 is mechanically stationary at a predetermined position of a plurality of predetermined positions. In other examples, radar apparatus 810 may be configured to simultaneously mechanically scan/rotate integrated radar device 811 with gimbaled mount 815 while integrated radar device 811 electronically scans the radar transmit beam. Electronically scanning the transmit beam while stationary at a predetermined position may have advantages in simplifying the operation of radar apparatus 810. For example, signal processing circuitry within integrated radar device 811 may be less complex if configured to interpret to angular position of a target from a fixed mechanical position of integrated radar device 811. The signal processing circuitry may also be configured to determine a more precise target location from a fixed mechanical position, when compared to considering both a moving electronic transmit beam and a moving integrated radar device 810.

Radar apparatus 810 of this disclosure may have advantages over other configurations of radar systems that perform similar functions. In addition to the advantages described above, a gimbaled mount that rotates only in the second illumination direction simplifies operation when compared to radar systems that mechanically aim a pencil beam type radar transmit beam in multiple directions. The pencil beam type radar systems may require multiple, high-torque motors to rapidly slew the pencil beam to cover the entire radar field of regard, such as in a complex raster pattern. In contrast, radar apparatus 810 of this disclosure may be configured to use less complex, lower torque motors, such as a brushless DC motor, which may reduce cost of radar apparatus 810 compared to mechanically scanned pencil beam radar systems. The reduced demand on motors in radar apparatus 810 may also improve reliability and mean time between failures (MTBF) when compared to other types of radar systems. Additionally, a single integrated radar device, fewer motors, and a less complex mechanical support system may have the advantage of reduced power consumption, reduced cost, reduce mass and less weight when compared to other existing radar systems.

Figure 9:
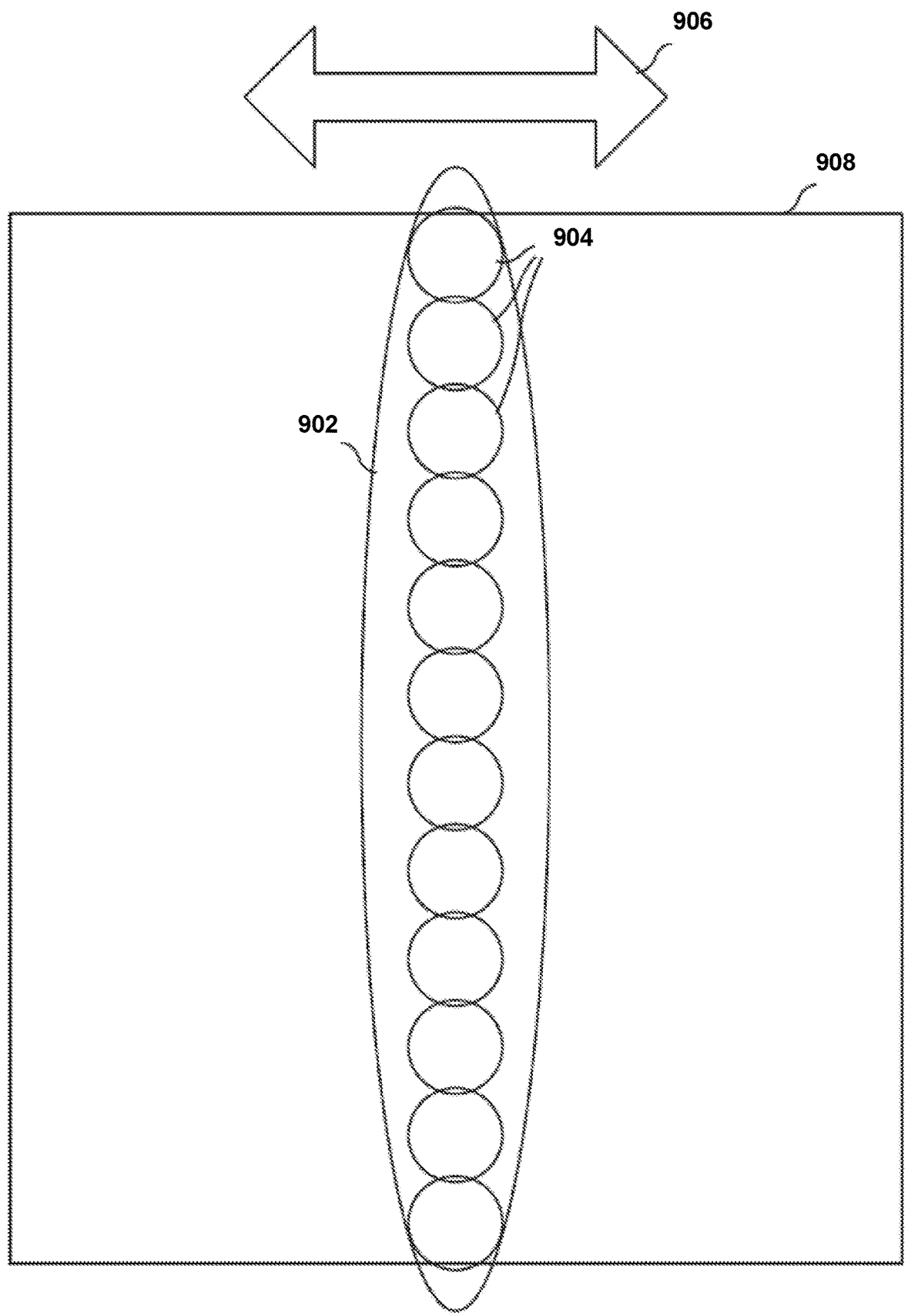
FIG. 9 is a conceptual diagram illustrating an example transmit beam and a plurality of example receive beams.

FIG. 9 is a conceptual diagram illustrating an example transmit beam 902 and a plurality of example receive beams 904, which may be generated using transmit array 618 and receive array 620. Transmit beam 902 is depicted as being approximately elliptical in shape, with a greater extent in elevation than in azimuth. FIG. 9 also depicts a representation of a predetermined area 908 which is to be illuminated by FMCW radar array 612 and phased-array radar panel 711 (FIGS. 5-7). As shown in FIG. 9, transmit beam 902 may be at least as tall in elevation as the elevation of predetermined area 908, such that transmit beam 902 illuminates the entire elevation of a section of predetermined area 908 without steering or scanning transmit beam 902 in elevation. In other examples, as described above, transmit beam 902 may be wide in azimuth and short in elevation. In general, transmit beam 902 may have a greater extent in a first illumination direction than in a second illumination dimension substantially perpendicular to the first illumination dimension.

A transmit electronics module associated with transmit array 618 may be configured to scan, or steer, transmit beam 902 in azimuth (e.g., the second illumination dimension), as indicated by arrow 906. In some examples, the transmit electronics module may be configured to apply a phase shift to each transmit antenna element of the plurality of transmit antenna elements 624 (FIG. 5) which changes as a function of time, which results in transmit beam 902 being scanned in azimuth.

A receive electronics module associated with receive array 620 is configured to electronically generate the plurality of receive beams 904. Although twelve receive beams 904 are illustrated in FIG. 9, in other examples, the receive electronics module may be configured to generate more or fewer receive beams 904 using receive array 620. Receive beams 904 are one example of multiple simultaneous receive beams. FIG. 9 illustrates receive beams 904 as vertically stacked (i.e., same azimuth angle), but receive beams 904 may be horizontally arrayed or stacked or positioned in arbitrary unstacked directions. For example, the receive electronics module associated with receive array 620 may be configured to generate at least two receive beams 904.

In some examples, the receive electronics module associated with receive array 620 is configured to scan, or steer, each of the plurality of receive beams 904 in the second illumination dimension (e.g., azimuth) in parallel with transmit beam 902. For example, the receive electronics module associated with receive array 620 may be configured to scan, or steer, each of the plurality of receive beams 904 in the second illumination dimension (e.g., azimuth) such that the plurality of receive beams 904 are scanned at the same rate and to corresponding locations so that the plurality of receive beams 904 are substantially always (e.g., always or nearly always) located within the area illuminated by transmit beam 902.

In some examples, the receive electronics module associated with receive array 620 may be configured to scan, or steer, the plurality of receive beams in the second illumination dimension (e.g., azimuth) by applying a phase shift to the signals received from each respective receive antenna element of the plurality of receive antenna elements 634. The receive electronics associated with receive array 620 then may process the phase-shifted signals as described below to produce phase-shifted and summed I and Q values for each row of receive antenna elements 634 in each respective quadrant of quadrants 632 (FIG. 5). For example, when each row of receive antenna elements 634 in each respective quadrant of quadrants 632 (FIG. 5) includes twelve elements, the receive electronics module associated with receive array 620 may be configured to generate a single phase-shifted and summed I value and a single phase-shifted and summed Q value for each row of twelve receive antenna elements 634 each time the receive array 620 is sampled.

The receive electronics module associated with receive array 620 also may be configured generate the plurality of receive beams 904 at predetermined first illumination dimension (e.g., elevation) positions by applying a complex beam weight to the phase-shifted and summed I and Q values for each row of each of quadrants 632 (FIG. 5). The phase-shifted and summed I and Q values determined by the receive electronics module for a single sample instance may be reused multiple times to generate the corresponding number or receive beams 904 at respective elevation positions. For example, to generate twelve receive beams 904, the receive electronics module associated with receive array 620 may apply twelve different complex beam weights to the phase-shifted and summed I and Q values for each row of each of quadrants 632 in twelve separate operations.

The plurality of complex beam weights may correspond to the number of receive beams 904. The values for each of the plurality of complex beam weights may be selected to result in the plurality of receive beams being generated at the respective predetermined elevation positions. As shown in FIG. 9, in some examples, the elevation positions of the plurality of receive beams 904 may be selected to substantially fully cover (e.g., fully cover or nearly fully cover) the elevation extent of the predetermined area 908 which is to be illuminated. In some examples, the adjacent ones of the plurality of receive beams 904 may partially overlap in elevation. In this way, the receive electronics associated with receive array 620 may generate a plurality of receive beams 904 at predetermined first illumination dimension (e.g., elevation) positions and scan, or steer, the plurality of receive beams 904 in the second illumination dimension (e.g., azimuth).

Additionally, because receive array 620 is conceptually (and, optionally, electrically) divided into quadrants 632, the receive electronics module associated with receive array 620 may be configured to generate monopulse tracking beams. This may be used to facilitate tracking of objects by radar system 610. By generating a transmit beam 902 and a plurality of receive beams 904, radar system 610 may perform monopulse tracking for each of receive beams 904, which may facilitate tracking multiple objects within predetermined area 908. For example, by digitally combining the I and Q values for the two left quadrants 632*a* and 632*c* together, digitally combining the I and Q values for the two right quadrants 632*b* and 632*d*, and determining the difference between I and Q values for the two left quadrants 632*a* and 632*c* and the I and Q values for the two right quadrants 632*b* and 632*d*, the receive electronics module may create an azimuth monopulse tracking beam. Similarly, in some examples, by digitally combining the I and Q values for the top two quadrants 632*a* and 632*b*, and digitally combining the I and Q values for the bottom two quadrants 632*c* and 632*d*, and determining the difference between I and Q values for the two top quadrants 632a and 632b and the I and Q values for the two bottom quadrants 632c and 632d, the receive electronics module may create an elevation monopulse tracking beam. In some examples, by digitally combining the I and Q values for respective rows of all 4 quadrants 632, a reference sum beam may be created for comparison to the azimuth and elevation monopulse tracking beams. This may permit an accurate phase comparison monopulse to be created for each of receive beams 904. Additionally, as each of FMCW radar arrays 612 is configured to generate a transmit beam 902 and a plurality of receive beams 904, which are scanned within a corresponding predetermined window, this may facilitate tracking of multiple objects by radar system 610.

In some examples, instead of being associated with a single receive array 620, the receive electronics module may be associated with multiple receive arrays 620. In other examples, a first portion of the receive electronics module may be associated with a single receive array, and a second portion of the receive electronics module may be associated with multiple receive arrays. For example, a portion of the receive electronics module that performs frequency downconversion and analog beam steering using phase shifts may be associated with a single array (e.g., receive array 620 of FIG. 5), and each receive array may include a respective portion that performs frequency downconversion and analog beam steering using phase shifts. Continuing this example, a portion of the receive electronics module applies complex beam weight to the phase-shifted and summed I and Q values for each row of each of quadrants 632 to form the receive beams at predetermined elevation positions and form monopulse tracking beams may be associated with multiple receive arrays. In some examples, then, different portions of the receive electronics module may be conceptually associated with different receive arrays 620 or multiple receive arrays, physically associated with different receive arrays 620, may be physically separate from receive arrays 620, or the like.

The following examples may illustrate one or more of the techniques of this disclosure.

Example 1

A system is configured for determining an estimated altitude of a melting layer, and the system includes a weather radar device configured to transmit radar signals and receive reflected radar signals. In some examples, the system also includes processing circuitry configured to determine the estimated altitude of the melting layer based on a difference in reflectivity based on the reflected radar signals.

Example 2

The system of example 1, wherein the processing circuitry is configured to determine the estimated altitude of the melting layer by at least determining reflectivity at two locations based on the reflected radar signals, determining a rate of change in reflectivity between the two locations based on a difference between the reflectivity at the two locations and further based on an altitude difference between the two locations, and determining that the rate of change in reflectivity between the two locations is less than a threshold level.

Example 3

The system of examples 1-2 or any combination thereof, wherein the processing circuitry is configured to determine the estimated altitude of the melting layer by at least determining a rate of change in reflectivity based on the reflected radar signals, wherein a positive value for the rate of change in reflectivity indicates that reflectivity increases as altitude increases. The processing circuitry is configured to determine the estimated altitude of the melting layer by at least determining a highest altitude at which the rate of change in reflectivity is less than a threshold level.

Example 4

The system of examples 1-3 or any combination thereof, wherein the processing circuitry is further configured to determine a bright-band altitude at which a magnitude of reflectivity is highest based on the reflected radar signals. The processing circuitry is configured to determine the estimated altitude of the melting layer at an altitude that is higher than the bright-band altitude.

Example 5

The system of examples 1-4 or any combination thereof, wherein the estimated altitude of the melting layer is a final estimated altitude of the melting layer, and the system is configured to mount on a vehicle. The processing circuitry is further configured to determine an initial estimated altitude of the melting layer based on a temperature at an altitude of the vehicle and an algorithm including a temperature change per change in altitude. The processing circuitry is also configured to cause the weather radar device to transmit radar signals at an angle towards the initial estimated altitude of the melting layer. The processing circuitry is configured to determine the final estimated altitude of the melting layer based on the radar signals transmitted at the angle that are reflected back to the weather radar device.

Example 6

The system of examples 1-5 or any combination thereof, wherein the weather radar device is configured to receive the reflected radar signals by at least receiving multiple beams of reflected radar signals. The processing circuitry is configured to determine the estimated altitude of the melting layer by at least determining an estimated altitudes of the melting layer for each beam of the multiple beams based on a difference in reflectivity based on the reflected radar signals along each beam of the multiple beams.

Example 7

The system of examples 1-6 or any combination thereof, wherein the processing circuitry is configured to determine the estimated altitude of the melting layer by at least determining a sample of estimated altitudes for the multiple beams and determining the estimated altitude of the melting layer based on an average of the sample of estimated altitudes.

Example 8

The system of examples 1-7 or any combination thereof, wherein the processing circuitry is configured to determine the estimated altitude of the melting layer by at least determining a standard deviation for each estimated altitude in the sample of estimated altitudes, removing an outlying estimated altitude from the sample of estimated altitudes based on the standard deviation of the outlying estimated altitude, and determining the estimated altitude of the melting layer based on an average of the sample of estimated altitudes after removing the outlying estimated altitude.

Example 9

The system of examples 1-8 or any combination thereof, wherein the weather radar device is further configured to perform at least one of the following weather functions: volumetric reflectivity scan, predicting hail, predicting lightning, predicting areas of attenuated radar signal, tracking storm movements, tracking storm growth, or rendering weather information on a display.

Example 10

The system of examples 1-9 or any combination thereof, wherein the processing circuitry is further configured to determine a presence of high-altitude ice crystals based on the estimated altitude of the melting layer.

Example 11

A method is for determining an estimated altitude of a melting layer, and the method includes transmitting radar signals by a weather radar device. The method also includes receiving reflected radar signals at the weather radar device and determining the estimated altitude of the melting layer based on a difference in reflectivity based on the reflected radar signals.

Example 12

The method of example 11, wherein determining the estimated altitude of the melting layer includes determining reflectivity at two locations based on the reflected radar signals, determining a rate of change in reflectivity between the two locations based on a difference between the reflectivity at the two locations and further based on an altitude difference between the two locations, and determining that the rate of change in reflectivity between the two locations is less than a threshold level.

Example 13

The method of examples 11-12 or any combination thereof, further comprising determining a bright-band altitude at which a magnitude of reflectivity is highest based on the reflected radar signals, wherein determining the estimated altitude of the melting layer comprises determining the estimated altitude of the melting layer at an altitude that is higher than the bright-band altitude.

Example 14

The method of examples 11-13 or any combination thereof, wherein the estimated altitude of the melting layer is a final estimated altitude of the melting layer, the method further including determining an initial estimated altitude of the melting layer based on a temperature at an altitude of the weather radar device and an algorithm including a temperature change per change in altitude, transmitting the radar signals at an angle towards the initial estimated altitude of the melting layer, and determining the final estimated altitude of the melting layer based on the radar signals transmitted at the angle that are reflected back to the weather radar device.

Example 15

The method of examples 11-14 or any combination thereof, wherein receiving the reflected radar signals comprises receiving multiple beams of reflected radar signals. Determining the estimated altitude of the melting layer comprises determining an estimated altitude of the melting layer for each beam of the multiple beams based on a difference in reflectivity determined based on the reflected radar signals along each beam of the multiple beams.

Example 16

The method of examples 11-15 or any combination thereof, further comprising performing at least one of the following weather functions: volumetric reflectivity scan, predicting hail, predicting lightning, predicting areas of attenuated radar signal, tracking storm movements, tracking storm growth, or rendering weather information on a display.

Example 17

A device includes a computer-readable medium having executable instructions stored thereon, configured to be executable by one or more processors for causing the one or more processors to cause a weather radar device to transmit radar signals and receive reflected radar signals. The executable instructions further cause the one or more processors to determine an estimated altitude of a melting layer based on a difference in reflectivity based on the reflected radar signals.

Example 18

The device of example 17, wherein the estimated altitude of the melting layer is a final estimated altitude of the melting layer, and wherein the device is configured to mount on a vehicle, wherein the executable instructions further cause the one or more processors to determine an initial estimated altitude of the melting layer based on a temperature at an altitude of the vehicle and an algorithm including a temperature change per change in altitude, cause the weather radar device to transmit radar signals at an angle towards the initial estimated altitude of the melting layer, and determine the final estimated altitude of the melting layer based on the radar signals transmitted at the angle that are reflected back to the weather radar device.

Example 19

The device of examples 17-18 or any combination thereof, wherein the executable instructions cause the one or more processors to cause the weather radar device to receive the reflected radar signals by at least receiving multiple beams of reflected radar signals. The executable instructions cause the one or more processors to determine the estimated altitude of the melting layer by at least determining an estimated altitude of the melting layer for each beam of the multiple beams based on a difference in reflectivity based on the reflected radar signals along each beam of the multiple beams.

Example 20

The device of examples 17-19 or any combination thereof, wherein the executable instructions cause the one or more processors to cause the weather radar device to perform at least one of the following weather functions: volumetric reflectivity scan, predicting hail, predicting lightning, predicting areas of attenuated radar signal, tracking storm movements, tracking storm growth, or rendering weather information on a display.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

System 100 may include one or more memory devices, such as memory device 114, that include any volatile or non-volatile media, such as a RAM, ROM, non-volatile RAM (NVRAM), electrically erasable programmable ROM (EEPROM), flash memory, and the like. The one or more memory devices may store computer-readable instructions that, when executed by processing circuitry, cause the processing circuitry to implement the techniques attributed herein to processing circuitry.

Elements of processing circuitry 112 and/or weather radar device 110 may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of processing circuitry 112 and/or weather radar device 110 as in any of the examples herein may be implemented as a device, a system, an apparatus, and may embody or implement a method of determining an estimated altitude of a melting layer.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

Various illustrative aspects of the disclosure are described above. These and other aspects are within the scope of the following claims.

What is claimed is:

1. A system for determining an estimated altitude of a melting layer, the system comprising:
   a weather radar device configured to:
   transmit radar signals, and
   receive reflected radar signals by at least receiving multiple simultaneous beams of the reflected radar signals; and
   processing circuitry configured to:
   form vertically stacked beams from the multiple simultaneous beams; and
   determine the estimated altitude of the melting layer based on a difference in reflectivity for the reflected radar signals by at least:
   determining an estimated altitude of the melting layer for each beam of the vertically stacked beams based on a difference in reflectivity for the reflected radar signals along each beam of the vertically stacked beams; and
   finding a particular altitude at which a second derivative of reflectivity with respect to altitude is zero and a first derivative of reflectivity is negative, wherein a positive value for the first derivative of reflectivity indicates that reflectivity increases as altitude increases.

2. The system of claim 1, wherein the processing circuitry is configured to determine the estimated altitude of the melting layer by at least:
   determining reflectivity at two locations along a beam of the vertically stacked beams based on the reflected radar signals;
   determining a rate of change in reflectivity between the two locations based on a difference between the reflectivity at the two locations and further based on an altitude difference between the two locations; and
   determining that the rate of change in reflectivity between the two locations is less than a threshold level.

3. The system of claim 1, wherein the processing circuitry is configured to determine the estimated altitude of the melting layer by at least:
   determining a rate of change in reflectivity based on the reflected radar signals, wherein a positive value for the rate of change in reflectivity indicates that reflectivity increases as altitude increases; and
   determining a highest altitude at which the rate of change in reflectivity is less than a threshold level.

4. The system of claim 1,
   wherein the processing circuitry is further configured to determine a bright-band altitude at which a magnitude of reflectivity is highest based on the reflected radar signals,
   wherein the processing circuitry is configured to determine the estimated altitude of the melting layer at an altitude that is higher than the bright-band altitude.

5. The system of claim 1,
   wherein the estimated altitude of the melting layer is a final estimated altitude of the melting layer, and wherein the system is configured to mount on a vehicle, wherein the processing circuitry is further configured to:
determine an initial estimated altitude of the melting layer based on a temperature at an altitude of the vehicle and an algorithm including a temperature change per change in altitude;
cause the weather radar device to transmit radar signals at an angle towards the initial estimated altitude of the melting layer; and
determine the final estimated altitude of the melting layer based on the radar signals transmitted at the angle that are reflected back to the weather radar device.

6. The system of claim 1, wherein the processing circuitry is configured to determine the estimated altitude of the melting layer by at least:
determining a sample of estimated altitudes for the vertically stacked beams; and
determining the estimated altitude of the melting layer based on an average of the sample of estimated altitudes.

7. The system of claim 6, wherein the processing circuitry is configured to determine the estimated altitude of the melting layer by at least:
determining a standard deviation for each estimated altitude in the sample of estimated altitudes;
removing an outlying estimated altitude from the sample of estimated altitudes based on the standard deviation of the outlying estimated altitude; and
determining the estimated altitude of the melting layer based on an average of the sample of estimated altitudes after removing the outlying estimated altitude.

8. The system of claim 1, wherein the weather radar device is further configured to perform at least one of the following weather functions: volumetric reflectivity scan, predicting hail, predicting lightning, predicting areas of attenuated radar signal, tracking storm movements, tracking storm growth, or rendering weather information on a display.

9. The system of claim 1, wherein the processing circuitry is further configured to determine a presence of high-altitude ice crystals based on the estimated altitude of the melting layer.

10. A method for determining an estimated altitude of a melting layer, the method comprising:
transmitting radar signals by a weather radar device;
receiving reflected radar signals at the weather radar device by at least receiving multiple simultaneous beams of the reflected radar signals;
forming vertically stacked beams from the multiple simultaneous beams; and
determining the estimated altitude of the melting layer based on a difference in reflectivity for the reflected radar signals by at least:
determining an estimated altitude of the melting layer for each beam of the vertically stacked beams based on a difference in reflectivity for the reflected radar signals along each beam of the vertically stacked beams; and
finding a particular altitude at which a second derivative of reflectivity with respect to altitude is zero and a first derivative of reflectivity is negative, wherein a positive value for the first derivative of reflectivity indicates that reflectivity increases as altitude increases.

11. The method of claim 10, wherein determining the estimated altitude of the melting layer comprises:
determining reflectivity at two locations along a beam of the vertically stacked beams based on the reflected radar signals;
determining a rate of change in reflectivity between the two locations based on a difference between the reflectivity at the two locations and further based on an altitude difference between the two locations; and
determining that the rate of change in reflectivity between the two locations is less than a threshold level.

12. The method of claim 10, further comprising determining a bright-band altitude at which a magnitude of reflectivity is highest based on the reflected radar signals, wherein determining the estimated altitude of the melting layer comprises determining the estimated altitude of the melting layer at an altitude that is higher than the bright-band altitude.

13. The method of claim 10, wherein the estimated altitude of the melting layer is a final estimated altitude of the melting layer, the method further comprising:
determining an initial estimated altitude of the melting layer based on a temperature at an altitude of the weather radar device and an algorithm including a temperature change per change in altitude;
transmitting the radar signals at an angle towards the initial estimated altitude of the melting layer; and
determining the final estimated altitude of the melting layer based on the radar signals transmitted at the angle that are reflected back to the weather radar device.

14. The method of claim 13, further comprising performing at least one of the following weather functions: volumetric reflectivity scan, predicting hail, predicting lightning, predicting areas of attenuated radar signal, tracking storm movements, tracking storm growth, or rendering weather information on a display.

15. A device comprising a computer-readable medium having executable instructions stored thereon, configured to be executable by one or more processors for causing the one or more processors to:
cause a weather radar device to:
transmit radar signals, and
receive reflected radar signals by at least receiving multiple simultaneous beams of the reflected radar signals;
form vertically stacked beams from the multiple simultaneous beams; and
determine an estimated altitude of a melting layer based on a difference in reflectivity for the reflected radar signals by at least:
determining an estimated altitude of the melting layer for each beam of the vertically stacked beams based on a difference in reflectivity for the reflected radar signals along each beam of the vertically stacked beams; and
finding a particular altitude at which a second derivative of reflectivity with respect to altitude is zero and a first derivative of reflectivity is negative, wherein a positive value for the first derivative of reflectivity indicates that reflectivity increases as altitude increases.

16. The device of claim 15,
wherein the estimated altitude of the melting layer is a final estimated altitude of the melting layer, and
wherein the device is configured to mount on a vehicle, wherein the executable instructions further cause the one or more processors to:
determine an initial estimated altitude of the melting layer based on a temperature at an altitude of the vehicle and an algorithm including a temperature change per change in altitude;

cause the weather radar device to transmit radar signals at an angle towards the initial estimated altitude of the melting layer; and determine the final estimated altitude of the melting layer based on the radar signals transmitted at the angle that are reflected back to the weather radar device.

17. The device of claim 15, wherein the executable instructions cause the one or more processors to cause the weather radar device to perform at least one of the following weather functions: volumetric reflectivity scan, predicting hail, predicting lightning, predicting areas of attenuated radar signal, tracking storm movements, tracking storm growth, or rendering weather information on a display.

18. The device of claim 15, wherein the executable instructions to determine the estimated altitude of the melting layer comprise executable instructions to:

determine reflectivity at two locations along a beam of the vertically stacked beams based on the reflected radar signals;

determine a rate of change in reflectivity between the two locations based on a difference between the reflectivity at the two locations and further based on an altitude difference between the two locations; and determine that the rate of change in reflectivity between the two locations is less than a threshold level.

19. The method of claim 10, wherein determining the estimated altitude of the melting layer comprises:

determining a rate of change in reflectivity based on the reflected radar signals, wherein a positive value for the rate of change in reflectivity indicates that reflectivity increases as altitude increases; and determining a highest altitude at which the rate of change in reflectivity is less than a threshold level.

20. The method of claim 10, wherein determining the estimated altitude of the melting layer comprises:

determining a sample of estimated altitudes for the vertically stacked beams; and determining the estimated altitude of the melting layer based on an average of the sample of estimated altitudes.

* * * * *